US010384772B2

(12) United States Patent
Yamada et al.

(10) Patent No.: US 10,384,772 B2
(45) Date of Patent: Aug. 20, 2019

(54) FLYING MACHINE FRAME STRUCTURAL BODY, FLYING MACHINE, FLYING MACHINE USAGE METHOD

(71) Applicant: FUJITSU LIMITED, Kawasaki-shi, Kanagawa (JP)

(72) Inventors: Moyuru Yamada, Machida (JP); Yoshiro Hada, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 15/220,378

(22) Filed: Jul. 26, 2016

(65) Prior Publication Data

US 2017/0050726 A1    Feb. 23, 2017

(30) Foreign Application Priority Data

Aug. 17, 2015   (JP) ................. 2015-160555

(51) Int. Cl.
| | |
|---|---|
| *B64C 29/00* | (2006.01) |
| *A63H 27/00* | (2006.01) |
| *A63H 33/00* | (2006.01) |
| *B64C 27/08* | (2006.01) |
| *B64C 25/36* | (2006.01) |
| *B64C 1/08* | (2006.01) |
| *B64D 47/08* | (2006.01) |

(Continued)

(52) U.S. Cl.
CPC ......... *B64C 29/0025* (2013.01); *A63H 27/12* (2013.01); *A63H 33/005* (2013.01); *B64C 1/08* (2013.01); *B64C 25/36* (2013.01); *B64C 25/54* (2013.01); *B64C 27/08* (2013.01); *B64C 27/20* (2013.01); *B64C 39/024* (2013.01); *B64D 1/22* (2013.01); *B64D 47/08* (2013.01); *B64C 2201/027* (2013.01); *B64C 2201/127* (2013.01)

(58) Field of Classification Search
CPC ....... B64C 25/36; B64C 27/006; B64C 27/20; B64C 29/0025; B64C 29/0091; B64C 37/00; B64C 39/028; B64C 2201/027; B64C 2201/123; B64C 2201/127; A63H 27/12; A63H 33/005; B62D 57/04
See application file for complete search history.

(56) References Cited

U.S. PATENT DOCUMENTS

| | | | | |
|---|---|---|---|---|
| 4,505,346 A | * | 3/1985 | Mueller | ................. B62D 57/04 180/21 |
| 7,273,195 B1 | * | 9/2007 | Golliher | ................. A63H 27/12 244/17.11 |

(Continued)

FOREIGN PATENT DOCUMENTS

| | | |
|---|---|---|
| CN | 104590562 | 5/2015 |
| JP | 3130396 U | 3/2007 |

(Continued)

OTHER PUBLICATIONS

EESR—The Extended European Search Report of European Patent Application No. 16181181.5 dated Mar. 13, 2017.

(Continued)

*Primary Examiner* — Nicholas McFall
(74) *Attorney, Agent, or Firm* — Fujitsu Patent Center

(57) ABSTRACT

A flying machine frame structural body including: a frame that surrounds a flying machine body including a rotating blade, and to which the flying machine body is fixed; and plural wheels that are rotatably supported by the frame.

25 Claims, 23 Drawing Sheets

(51) Int. Cl.
    *B64C 25/54*     (2006.01)
    *B64D 1/22*     (2006.01)
    *B64C 27/20*     (2006.01)
    *B64C 39/02*     (2006.01)

(56) References Cited

U.S. PATENT DOCUMENTS

| | | |
|---|---|---|
| 2014/0034776 A1 | 2/2014 | Hutson |
| 2014/0131507 A1 | 5/2014 | Kalantari et al. |

FOREIGN PATENT DOCUMENTS

| | | |
|---|---|---|
| JP | 2010-52713 | 3/2010 |
| JP | 2015-117003 | 6/2015 |
| JP | 2016-43922 | 4/2016 |
| WO | 2015/149000 A1 | 10/2015 |

OTHER PUBLICATIONS

CNOA—Office Action of Chinese Patent Application No. 201610596084.9 dated May 4, 2018, with full English translation of the Office Action.
JPOA—Office Action of Japanese Patent Application No. 2015-160555 dated Apr. 2, 2019, with full machine translation of the Office Action. ** Reference U.S. Pat. No. 7,273,195 listed in the JPOA was previously cited by the Examiner dated Sep. 21, 2018.

* cited by examiner

FIG.20
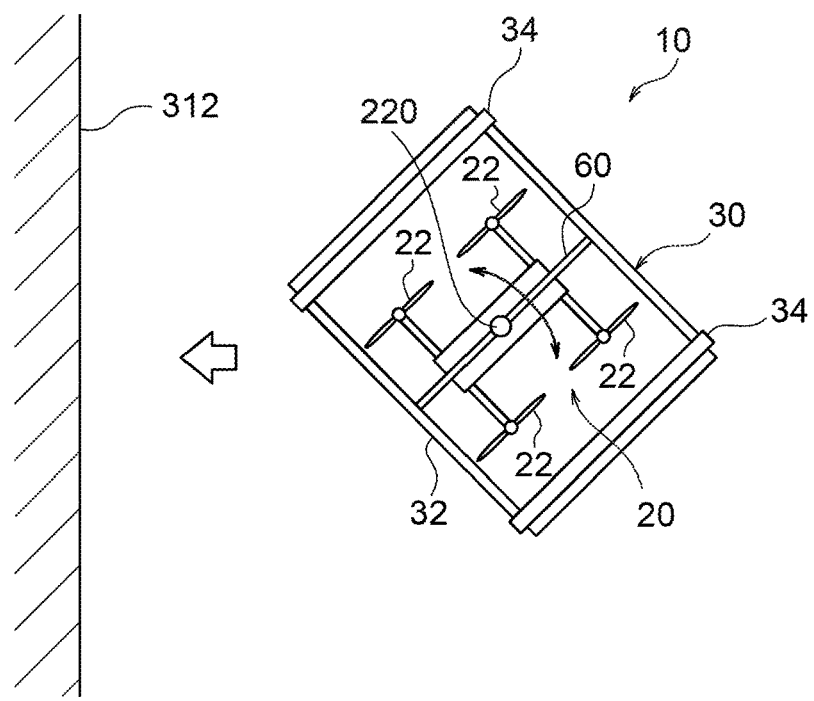
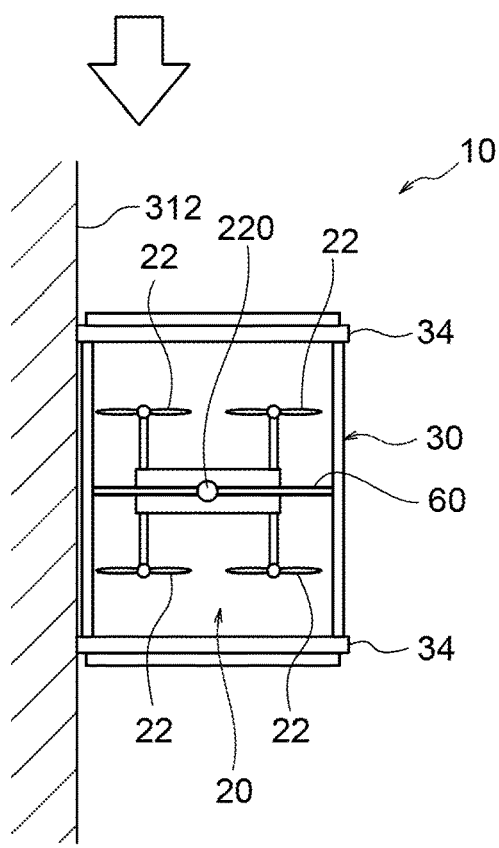

FLYING MACHINE FRAME STRUCTURAL BODY, FLYING MACHINE, FLYING MACHINE USAGE METHOD

CROSS-REFERENCE TO RELATED APPLICATION

This application is based upon and claims the benefit of priority of the prior Japanese Patent Application No. 2015-160555, filed on Aug. 17, 2015, the entire contents of which are incorporated herein by reference.

FIELD

Technology disclosed herein relates to a flying machine frame structural body, a flying machine, and a flying machine usage method.

BACKGROUND

Recently, flying machines that perform tasks such as photographic imaging or video recording with a camera during unmanned flight have been coming into use (see, for example, Patent Document 1).

RELATED PATENT DOCUMENTS

Japanese Patent Application Laid-Open (JP-A) No. 2010-52713
Japanese Utility Model Registration No. 3130396

Conceivably, adding plural wheels to such a flying machine, for example, could enable the flying machine to move across the ground surface or a wall surface, improving mobility performance of the flying machine.

SUMMARY

According to an aspect of the embodiments, a flying machine frame structural body includes: a frame that surrounds a flying machine body including a rotating blade, and to which the flying machine body is fixed; and plural wheels that are rotatably supported by the frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a drawing illustrating a flying machine according to a fifth exemplary embodiment and a usage state thereof.

DESCRIPTION OF EMBODIMENTS

First Exemplary Embodiment

Figure 1:
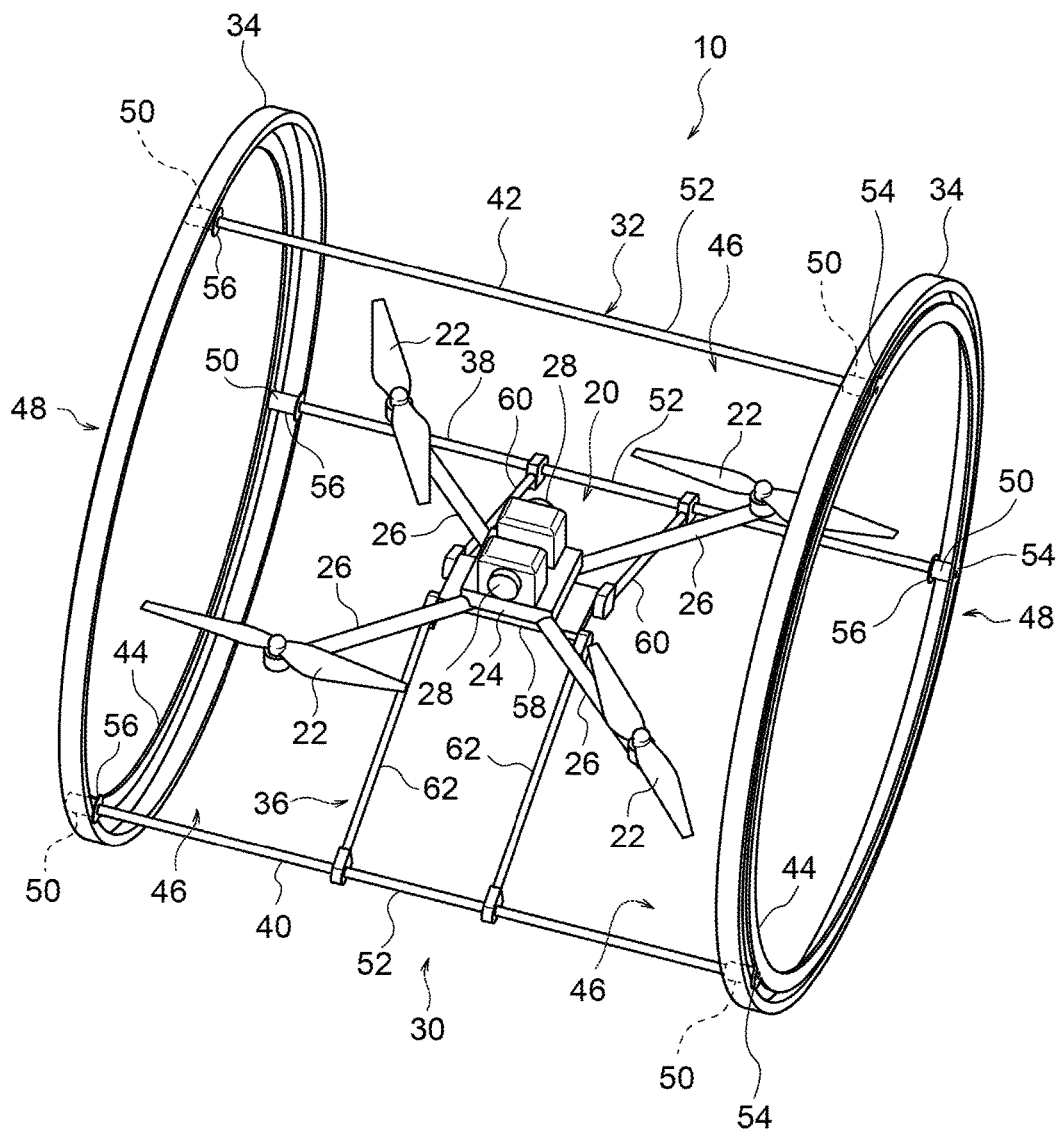
FIG. 1 is a perspective view of a flying machine according to a first exemplary embodiment.

First, explanation follows regarding a first exemplary embodiment of technology disclosed herein.

As illustrated in FIG. 1 to FIG. 4, a flying machine 10 according to the first exemplary embodiment includes a flying machine body 20 and a frame structural body 30.

The flying machine body 20 is, for example, a multicopter, and includes plural rotating blades 22. Each of the plural rotating blades 22 is disposed horizontally, and is rotated by rotation force from a motor or the like. Plural arms 26 extend out from a central body section 24 of the flying machine body 20 along a horizontal direction in an X pattern, and the plural rotating blades 22 are respectively provided to leading end portions of the plural arms 26.

A pair of cameras 28 are installed to the central body section 24 of the flying machine body 20. One of the cameras 28 is disposed facing toward the front of the flying machine body 20, and the other camera 28 is disposed facing toward the rear of the flying machine body 20.

Figure 5:
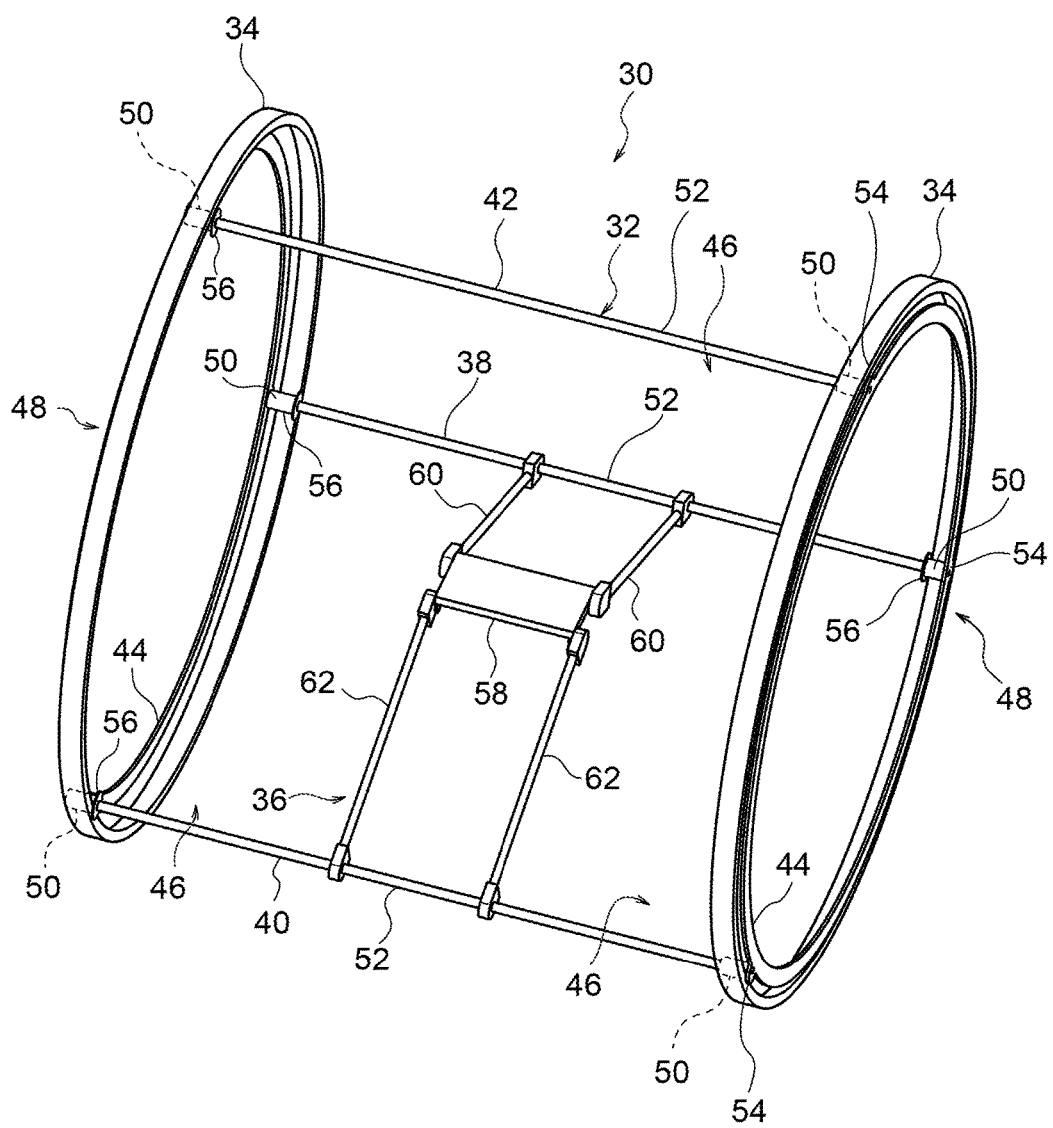
FIG. 5 is a perspective view illustrating a frame structural body according to the first exemplary embodiment.

The frame structural body 30 includes a frame 32, a pair of wheels 34, and an elastic support mechanism 36 (see also FIG. 5, as appropriate). The frame 32 is formed in a substantially circular tubular cage shape. The entire flying machine body 20, including the cameras 28, is surrounded by the frame 32. The frame 32 is disposed with its axial direction running in a direction orthogonal to the axial direction of the rotating blades 22 (in the horizontal direction). The frame 32 includes a pair of fixing rods 38, 40, a protective rod 42, and a pair of coupling members 44.

The pair of fixing rods 38, 40 and the protective rod 42 are examples of "plural rod members", and, for example, are each formed from long and narrow hollow pipes. The pair of wheels 34, described later, are provided at both axial direction end portions of the frame 32, and the pair of fixing rods 38, 40 and the protective rod 42 extend along the axial direction of the frame 32.

The pair of fixing rods 38, 40 are disposed further to a lower side than the protective rod 42. The flying machine body 20 is fixed to the pair of fixing rods 38, 40 through the elastic support mechanism 36, described later. The pair of fixing rods 38, 40 and the protective rod 42 are disposed at substantially uniform intervals around a circumferential direction of the wheels 34 so as to surround the flying machine body 20, and have a function of protecting the flying machine body 20. Gaps are secured between the pair of fixing rods 38, 40 and the protective rod 42, and the gaps between the pair of fixing rods 38, 40 and the protective rod 42 place the inside and the outside of the frame 32 in communication with each other to form communication portions 46 through which airflow accompanying flying of the flying machine body 20 (airflow accompanying rotation of the rotating blades 22) passes.

A pair of shaft bearing portions 48 for supporting the pair of wheels 34, described later, are respectively provided at both end portions of the frame 32. One of the shaft bearing portions 48 is formed by plural support portions 50 respectively formed to one end portions of the pair of fixing rods 38, 40 and the protective rod 42. The other of the shaft bearing portions 48 is formed by plural support portions 50 respectively formed to other end portions of the pair of fixing rods 38, 40 and the protective rod 42. The plural support portions 50 are respectively formed at both end portions of the pair of fixing rods 38, 40 and the protective rod 42 so as to be disposed at intervals (at substantially uniform intervals) around the circumferential direction of the respective wheels 34.

Respective portions of the pair of fixing rods 38, 40 and of the protective rod 42 between the plural support portions 50 at one end of the frame 32 and the plural support portions 50 at the other end of the frame 32 form respective coupling sections 52 that couple the plural support portions 50 at the one end and the plural support portions 50 at the other end together.

The pair of coupling members 44 are respectively provided at both end portions of the frame 32. The pair of coupling members 44 are each formed in a circular ring shape around the circumferential direction of the respective wheels 34. One of the coupling members 44 is formed in a circular ring shape following the circumferential direction of one of the wheels 34 so as to couple together leading end portions of the plural support portions 50 at the one end. Similarly, the other coupling member 44 is formed in a circular ring shape following the circumferential direction of the other wheel 34 so as to couple together leading end portions of the plural support portions 50 at the other end.

The pair of coupling members 44 are configured with a slightly smaller diameter than the wheels 34, such that the overall frame 32, including the coupling members 44, is disposed further to the inside than outer circumferential faces of the pair of wheels 34 in a radial direction of the wheels 34. The pair of coupling members 44 jut out further to the outside than the pair of wheels 34 in the axial direction of the pair of wheels 34.

The pair of wheels 34 are provided at both end portions of the frame 32. The pair of wheels 34 are capable of rotating with respect to the frame 32 due to being supported from the inner side of the wheels 34 by the plural support portions 50 forming the respective shaft bearing portions 48. The pair of wheels 34 are provided at both end portions of the frame 32 so as to be disposed at both lateral width direction sides of the flying machine body 20.

The respective coupling members 44 described above are each formed with anti-removal portions 54 at positions corresponding to the plural support portions 50. The respective anti-removal portions 54 project out from the coupling members 44 to a radial direction outside of the respective coupling members 44. Respective ring shaped anti-removal members 56 are provided on both end portion sides of the pair of fixing rods 38, 40 and the protective rod 42. The respective wheels 34 are supported from both sides in the axial direction of the wheels 34 by the plural anti-removal portions 54 and the plural anti-removal members 56, thereby preventing the wheels 34 from coming off the frame 32.

The elastic support mechanism 36 includes a base member 58 and plural support arms 60, 62. The base member 58 is formed in a flat plate shape, and the flying machine body 20 is fixed to the base member 58.

Figure 2:
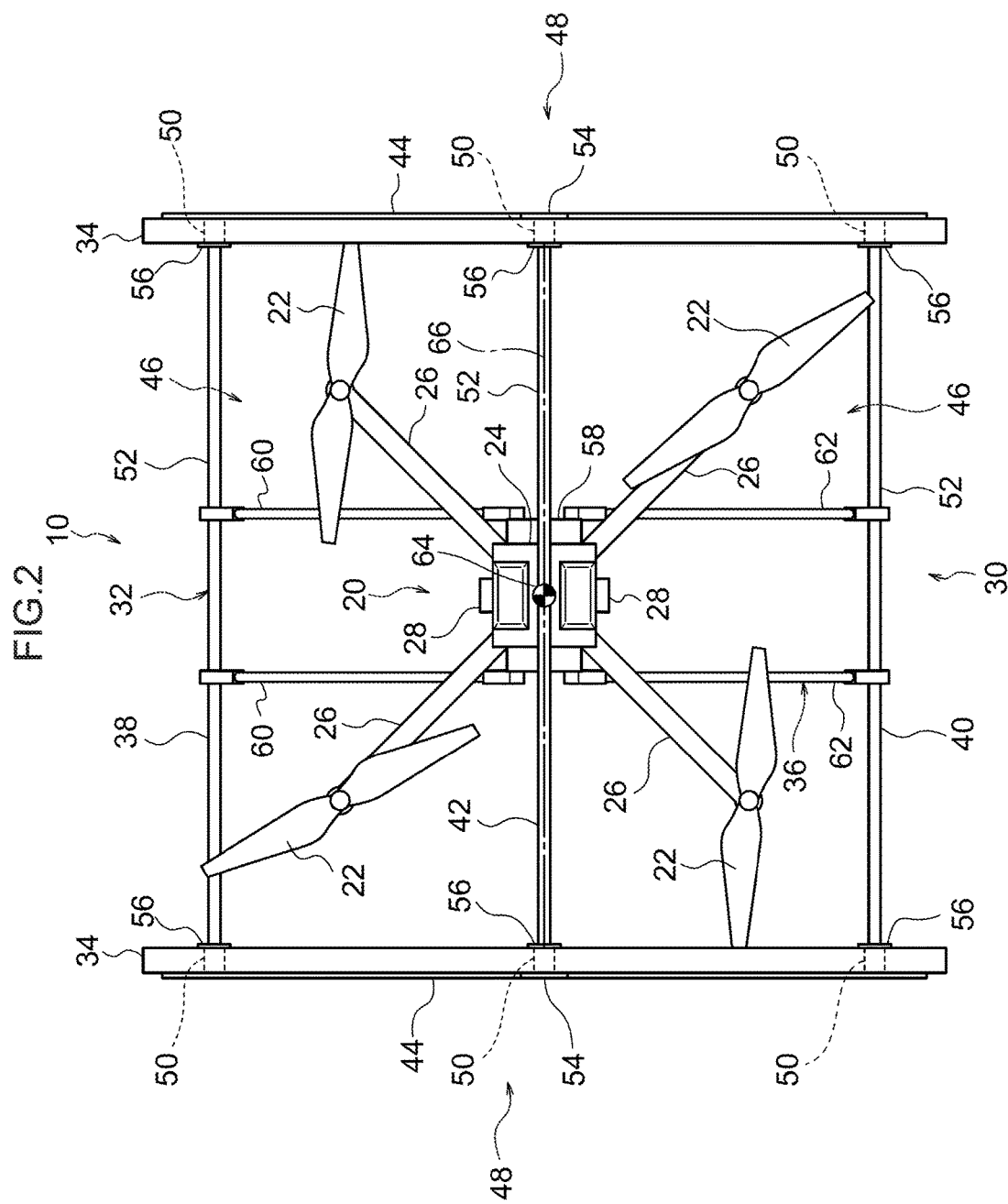
FIG. 2 is a plan view of a flying machine according to the first exemplary embodiment.
Figure 3:
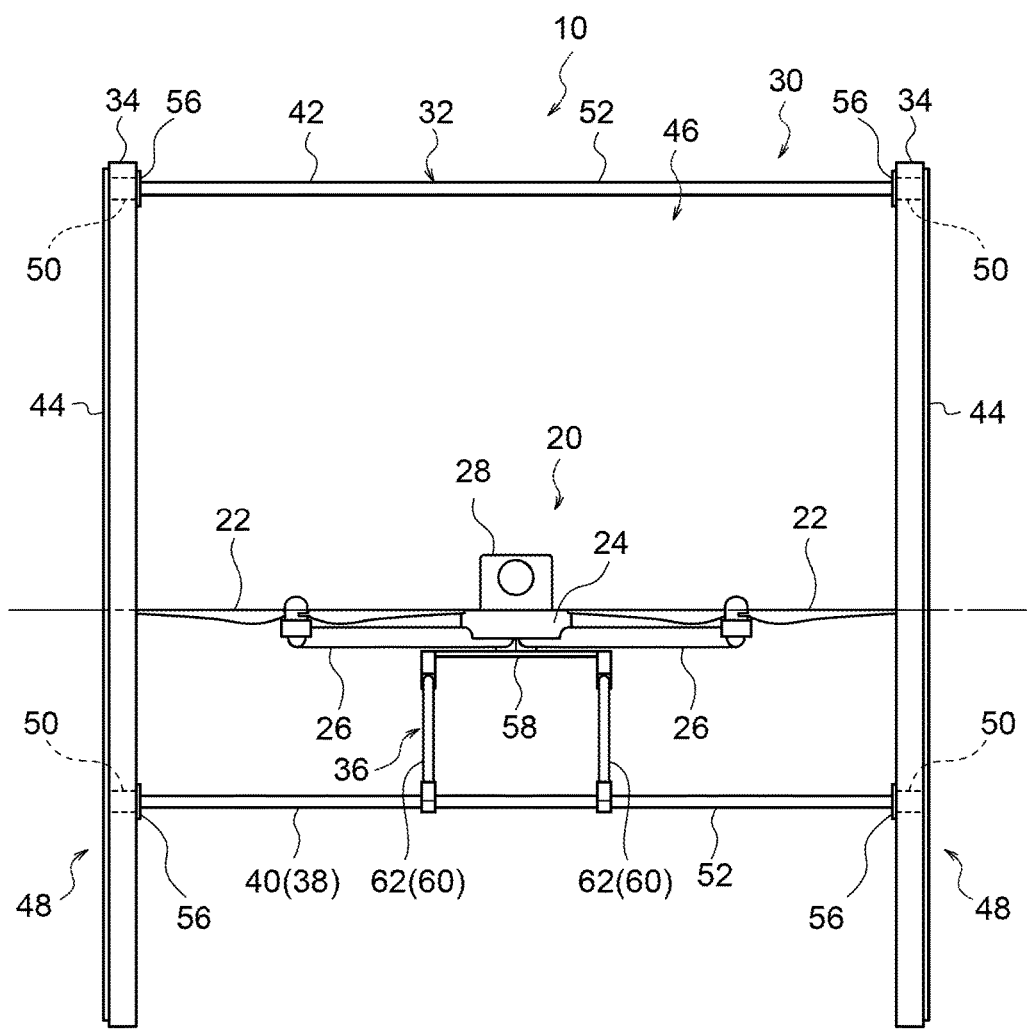
FIG. 3 is a front view of a flying machine according to the first exemplary embodiment.
Figure 4:
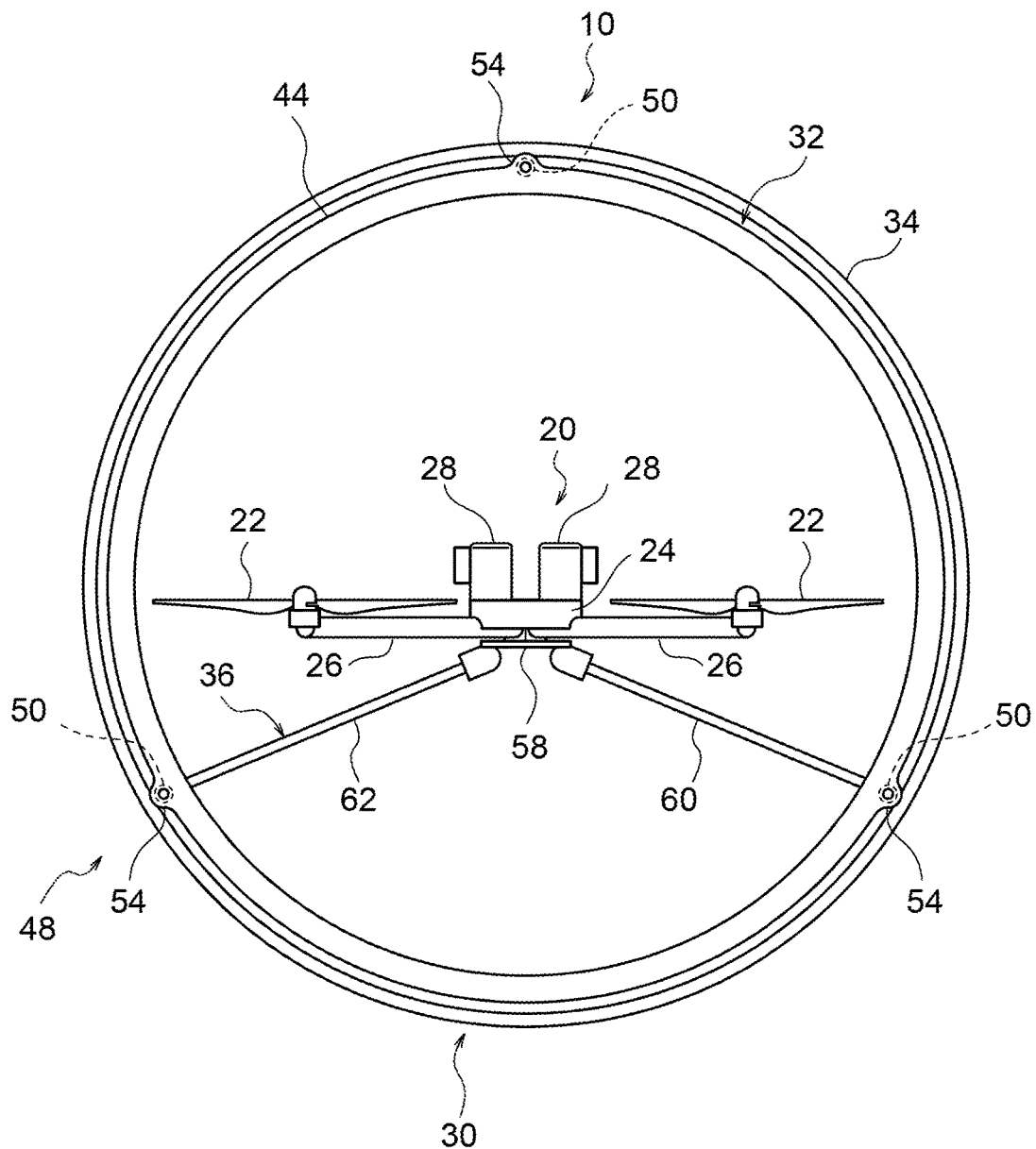
FIG. 4 is a side view of a flying machine according to the first exemplary embodiment.

In a state in which the flying machine body 20 is fixed to the frame 32 through the elastic support mechanism 36, the flying machine body 20 is disposed at a central portion between the pair of fixing rods 38, 40 and the protective rod 42 in a vertical direction, and is disposed at a central portion in the axial direction of the frame 32. As illustrated in FIG. 3, as viewed along the horizontal direction, the rotating blades 22 are disposed at the height of the center of rotation of the pair of wheels 34. Moreover, as illustrated in FIG. 2, a center of gravity 64 of the flying machine 10 is positioned at a central portion of a rotation axis line 66 connecting the centers of the pair of wheels 34 together.

One ends of the pair of support arms 60 are rotatably coupled to one fixing rod 38, and the other ends of the pair of support arms 60 are rotatably coupled to the base member 58. One ends of the pair of support arms 62 are rotatably coupled to the other fixing rod 40, and the other ends of the pair of support arms 62 are rotatably coupled to the base member 58.

At least one set of coupling portions out of the coupling portions between the pair of support arms 60 and the fixing rod 38, and the coupling portions between the pair of support arms 60 and the base member 58, has an inbuilt elastic device such as a damper. Similarly, at least one set of coupling portions out of the coupling portions between the pair of support arms 62 and the fixing rod 40, and the coupling portions between the pair of support arms 62 and the base member 58, has an inbuilt elastic device such as a damper. The flying machine body 20 is elastically supported on the frame structural body 30 by the elastic support mechanism 36 that includes the elastic devices.

Next, explanation follows regarding a usage method of the flying machine 10 described above.

Figure 6:
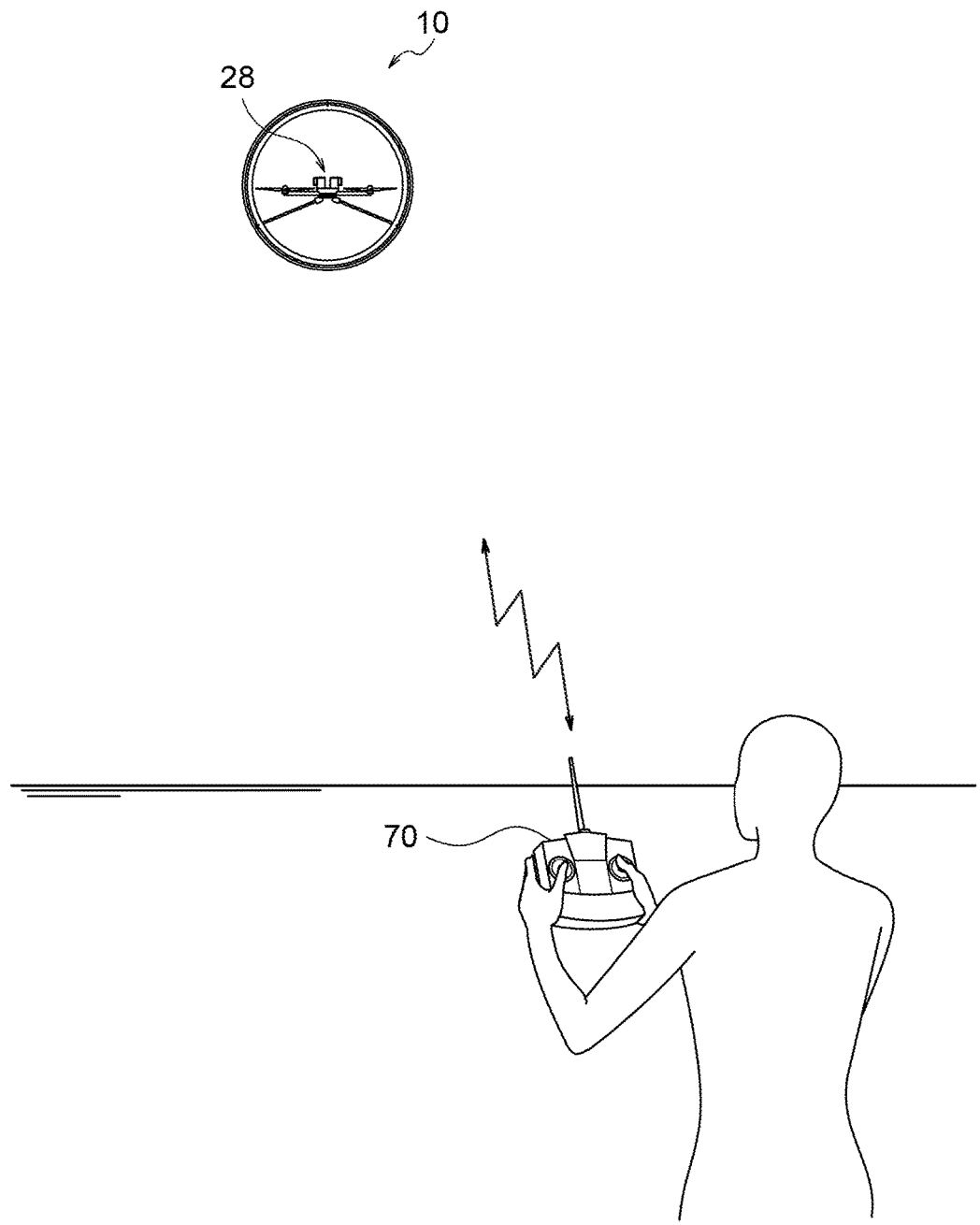
FIG. 6 is a drawing illustrating a first Example of a usage method of a flying machine according to the first exemplary embodiment.

FIG. 6 illustrates a first Example of a usage method of the flying machine 10 according to the first exemplary embodiment. The flying machine 10 flies based on signals emitted from a controller 70 operated by an operator. The signals emitted from the controller 70 are preferably transmitted wirelessly to the flying machine 10; however they may be transmitted to the flying machine 10 through a cable.

In the first Example, the flying machine 10 performs at least one out of imaging, observations, recording, surveying, making inspections, transportation, coating, marking, or another task while flying. For example, the cameras 28 are employed for imaging, observations, recording, surveying, making inspections, and the like.

Note that the flying machine 10 may be installed with devices other than the cameras 28. Devices other than the cameras 28 may be employed when employing the flying machine 10 for performing imaging, observations, recording, surveying, making inspections, or the like. When employing the flying machine 10 for transportation, the flying machine 10 may be operated based on images obtained by communicating with the cameras 28.

Figure 7:
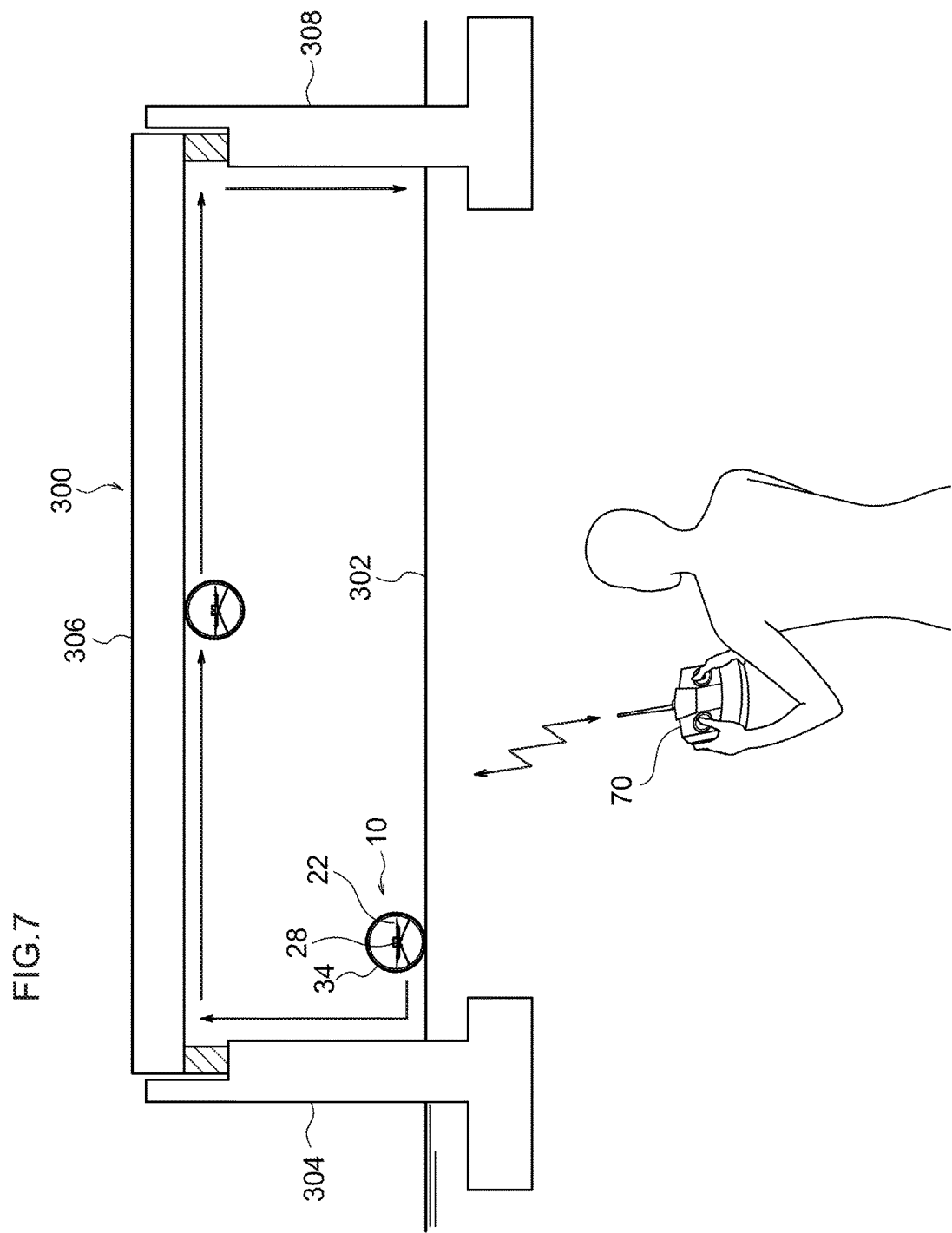
FIG. 7 is a drawing illustrating a second Example of a usage method of a flying machine according to the first exemplary embodiment.

FIG. 7 illustrates a second Example of a usage method of the flying machine 10 according to the first exemplary embodiment. In the second Example, the flying machine 10 is employed to survey or inspect a bridge 300. In the second Example, the flying machine 10 is operated in the following manner in order to survey or inspect the bridge 300.

Namely, the flying machine 10 is initially in a state placed on a ground surface 302. The rotating blades 22 are then rotated in a state in which the pair of wheels 34 are in contact with the ground surface 302, and the flying machine 10 moves across the ground surface 302 in conjunction with rotation of the pair of wheels 34 due to the contact with the ground surface 302.

Then, when the flying machine 10 reaches one bridge support 304, the pair of wheels 34 contact the one bridge support 304. The flying machine 10 then ascends the one bridge support 304 in a state in which the pair of wheels 34 are in contact with the one bridge support 304, in conjunction with rotation of the pair of wheels 34 due to the contact with the bridge support 304.

When the flying machine 10 reaches a bridge beam 306, the pair of wheels 34 contact a lower face of the bridge beam 306. The flying machine 10 then moves horizontally along the lower face of the bridge beam 306 in a state in which the pair of wheels 34 are in contact with the lower face of the bridge beam 306, in conjunction with rotation of the pair of wheels 34 due to the contact with the lower face of the bridge beam 306.

Then, when the flying machine 10 reaches another bridge support 308, the pair of wheels 34 contact the other bridge support 308. The flying machine 10 then descends along the other bridge support 308 in a state in which the pair of wheels 34 are in contact with the other bridge support 308, in conjunction with rotation of the pair of wheels 34 due to the contact with the other bridge support 308.

In the second Example, surveying or inspection of the bridge 300 is performed by the flying machine 10 as the flying machine 10 moves along the respective sections of the bridge 300 as described above.

Note that devices other than the cameras 28 may be employed when surveying or inspecting the bridge 300. The flying machine 10 may also be employed to perform tasks other than surveying or inspecting the bridge 300. Moreover, for example, the flying machine 10 may transport tools, components, or the like to workers working at height during construction work or surveying work on the bridge 300.

In the second Example, the flying machine 10 is employed with a bridge. However, the flying machine 10 may also be employed with at least one target object out of constructions other than bridges, tunnels, roofs, ladders, pylons, chimneys, large passenger aircraft, or other structures.

Figure 8:
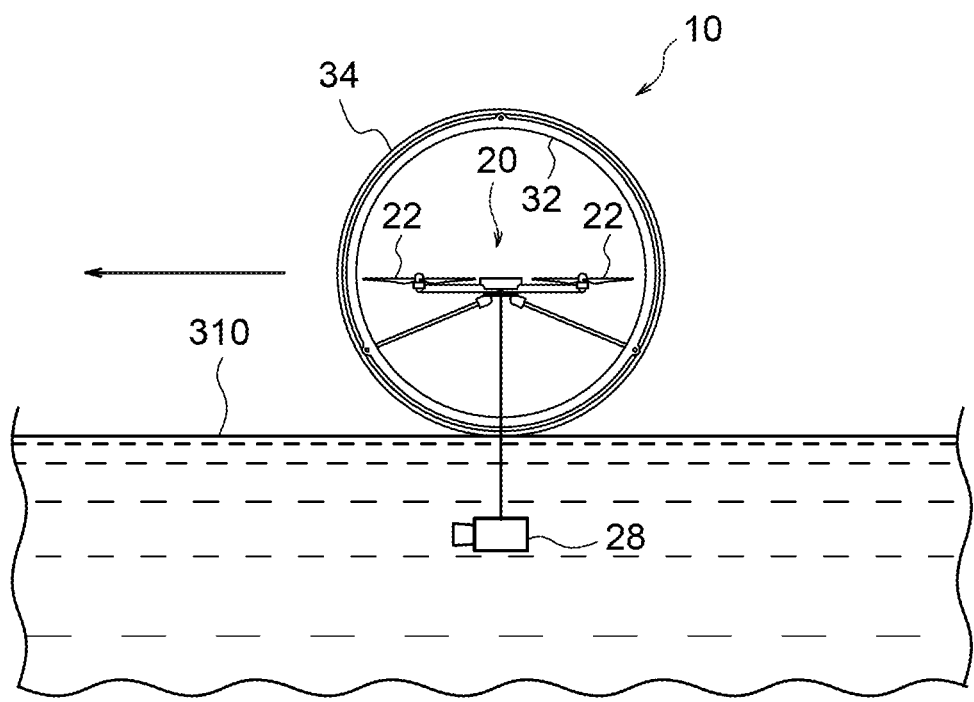
FIG. 8 is a drawing illustrating a third Example of a usage method of a flying machine according to the first exemplary embodiment.

FIG. 8 illustrates a third Example of a usage method of the flying machine 10 according to the first exemplary embodiment. In the third Example, the flying machine 10 is in a state floating on a water surface 310. In the third Example, the pair of wheels 34 preferably employ a foamed material such as expanded polystyrene or a foamed resin, such that the flying machine 10 floats on the water surface 310. The cameras 28 hang down at a lower side of the frame 32.

In the third Example, the rotating blades 22 are rotated in a state in which the pair of wheels 34 are in contact with the water surface 310, and the flying machine 10 moves across the water surface 310 in conjunction with rotation of the pair of wheels 34 due to the contact with the water surface 310. Imaging is performed by the cameras 28 while the flying machine 10 moves across the water surface 310.

Note that in the third Example, imaging is performed by the cameras 28. However, as well as imaging, at least one out of observations, recording, surveying, making inspections, transportation, coating, marking, or another task may be performed by the flying machine 10 moving across the water surface 310. The flying machine 10 may also be employed to perform tasks while combining movement across a water surface and airborne flight.

Figure 9:
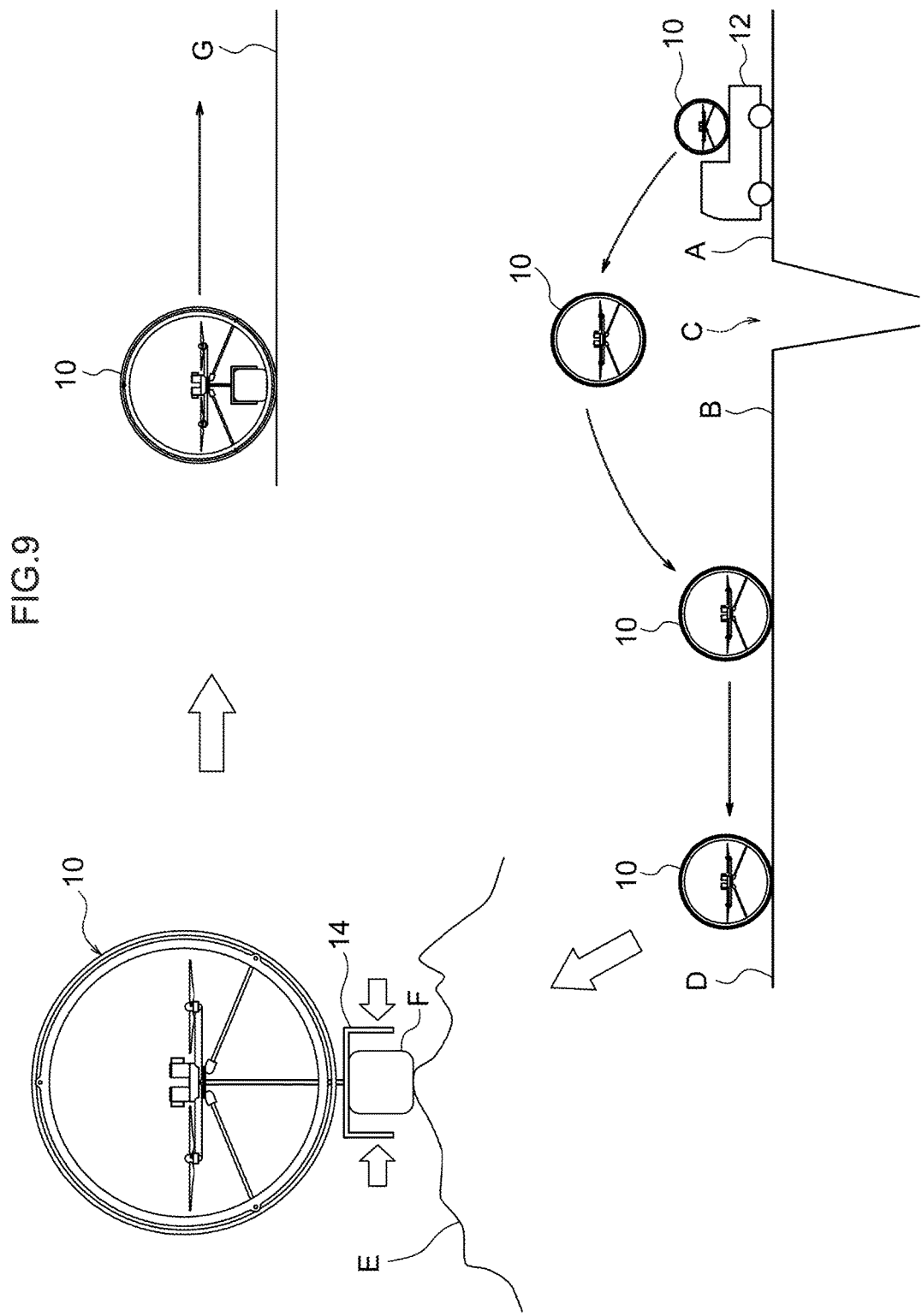
FIG. 9 is a drawing illustrating a fourth Example of a usage method of a flying machine according to the first exemplary embodiment.

FIG. 9 illustrates a fourth Example of a usage method of the flying machine 10 according to the first exemplary embodiment. In the fourth Example, the flying machine 10 is initially placed on a loading platform of a vehicular transporter 12, and is transported to a point A. A location C that the vehicular transporter 12 would have difficulty negotiating, such as a ravine, is present between the point A and a point B. The flying machine 10 therefore flies from point A to point B. The flying machine 10 that has arrived at point B then drives toward a point D. A point E, this being a destination, is located beyond point D.

Point E has terrain that the flying machine 10 would have difficulty negotiating. The flying machine 10 therefore flies from point D to point E. When the flying machine 10 has arrived above point E, a robot arm 14 is extended downward. The flying machine 10 then uses the robot arm 14 to grip and recover an object F, this being a recovery target object. After the flying machine 10 has recovered the object F using the robot arm 14, the robot arm 14 is stowed.

The flying machine 10 then moves from point E to a point G this being the final destination, by driving or flying, and ends the sequence of operations.

Next, explanation follows regarding operation and advantageous effects of the first exemplary embodiment.

As described in detail above, in the first exemplary embodiment, the flying machine 10 includes the pair of wheels 34. The flying machine 10 is capable of moving in a state in which the pair of wheels 34 are in contact with a target object. The flying machine 10 is accordingly capable of moving more steadily across the target object than in cases in which the wheels 34 are not provided, thereby enabling mobility performance of the flying machine 10 to be improved.

Since propelling power is provided by rotation of the rotating blades 22 when the flying machine 10 is moving across the target object, there is no need for a dedicated source of power to drive the wheels 34. This thereby enables a reduction in weight, and also enables mobility efficiency of the flying machine 10 to be improved in comparison to cases in which, for example, a dedicated source of power is provided to drive the wheels 34.

Moreover, since the stability of the flying machine 10 is increased due to the pair of wheels 34 contacting the target object, tasks such as imaging, making observations, recording, surveying, making inspections, transportation, coating, and marking can be performed more accurately.

Figure 10:
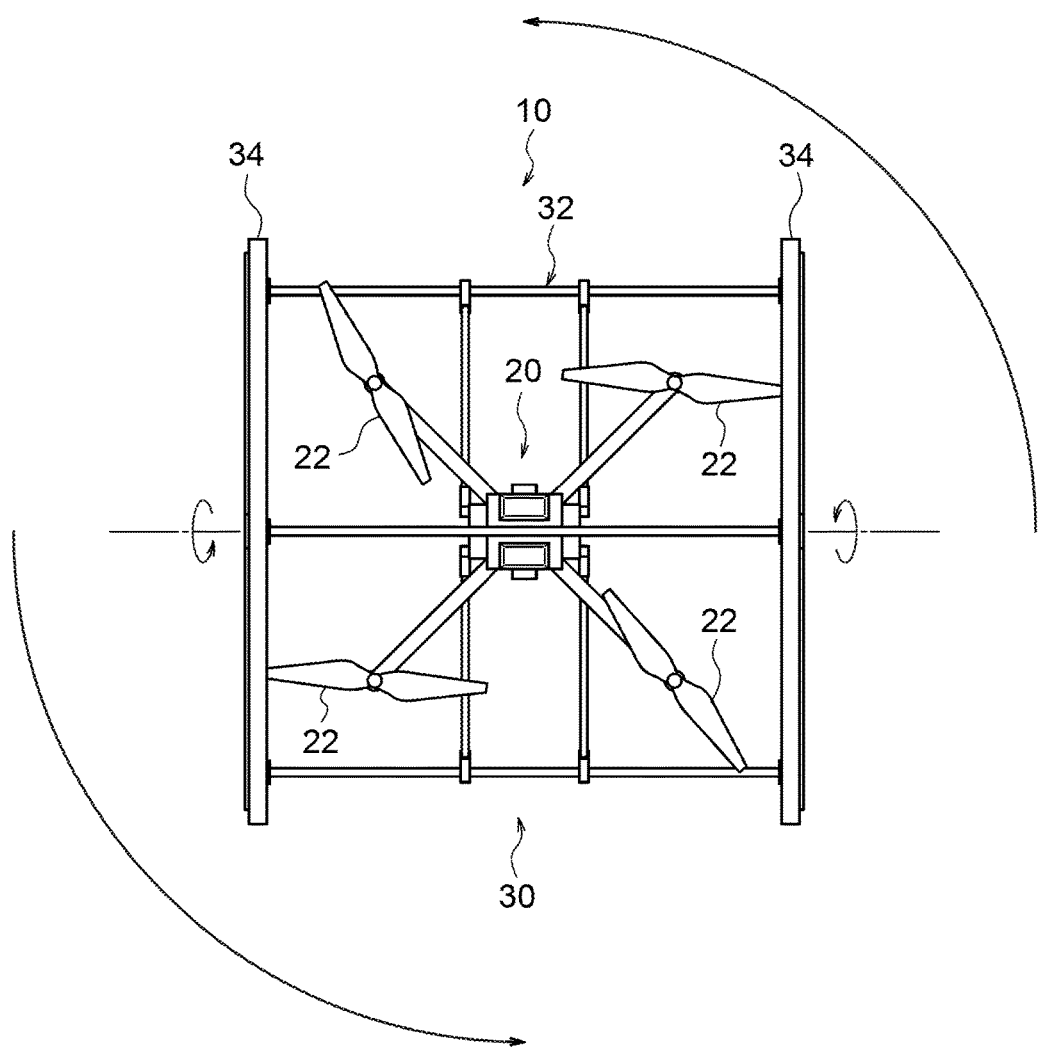
FIG. 10 is a drawing illustrating a flying machine according to the first exemplary embodiment when turning.

The pair of wheels 34 are capable of rotating independently of each other. This thereby enables the flying machine 10 to turn on the spot by rotating the pair of wheels 34 in opposite directions to each other, as illustrated in FIG. 10, for example, enabling maneuverability of the flying machine 10 to be improved.

The flying machine body 20 is surrounded by the frame 32 formed in a circular tubular cage shape, thereby enabling the flying machine body 20 to be protected by the frame 32.

Moreover, the pair of wheels 34 are rotatably supported by both end portions of the circular tubular cage shaped frame 32 surrounding the flying machine body 20. This thereby enables support rigidity of the pair of wheels 34 to be secured in comparison to cases in which, for example, the pair of wheels 34 are supported by both end portions of a single wheel shaft. This thereby enables oscillation of the pair of wheels 34 to be suppressed when the flying machine 10 is flying, for example, thereby enabling the stability of the flying machine 10 during flight to be improved.

In the frame structural body 30, the frame 32 is fixed, and the pair of wheels 34 rotate with respect to the frame 32. This thereby enables a reduction in size of the rotating parts (namely, parts that generate a gyroscopic effect when the flying machine 10 is in flight) in comparison to cases in which the frame 32 and the pair of wheels 34 rotate in their entirety. This thereby enables any effect on the flight of the flying machine 10 to be suppressed.

More specifically, the pair of wheels 34 are rotatably supported by the pair of shaft bearing portions 48 provided at both end portions of the frame 32. Each of the pair of shaft bearing portions 48 includes the plural support portions 50 disposed at intervals around the circumferential direction of the wheels 34, and the plural support portions 50 rotatably support the respective wheels 34.

This thereby enables spokes to be omitted from the wheels 34, enabling a reduction in weight, and also enabling a reduction in air resistance. As a result, this enables flight performance of the flying machine 10 to be improved, and also enables wind endurance performance of the flying machine 10 to be improved. Moreover, openings can be secured at side faces of the frame 32 by omitting spokes from the wheels 34, thereby enabling the field of vision of the cameras 28 to be enlarged.

The frame 32 includes the three rod members of the pair of fixing rods 38, 40, and the protective rod 42. The plural support portions 50 on one out of the pair of shaft bearing portions 48 and the plural support portions 50 on the other out of the pair of shaft bearing portions 48 are respectively coupled together by the plural coupling sections 52 formed by the three rod members. This thereby enables the coupling rigidity of the pair of shaft bearing portions 48, and therefore the support rigidity of the pair of wheels 34, to be improved, while securing the communication portions 46 that place the inside and the outside of the frame 32 in communication with each other between the plural coupling sections 52.

The plural support portions 50 are respectively formed at the end portions of the three rod members of the pair of fixing rods 38, 40, and the protective rod 42. This thereby enables an increase in the number of members to be suppressed, and also enables the structure of the plural support portions 50 to be simplified, thereby enabling a reduction in costs and a reduction in weight to be achieved.

The three rod members are configured by the pair of fixing rods 38, 40 to which the flying machine body 20 is fixed, and by the protective rod 42 that surrounds the flying machine body 20 together with the pair of fixing rods 38, 40. This thereby enables both fixing of the flying machine body 20 and protection of the flying machine body 20 to be achieved while keeping the number of rod members to a minimum. This thereby also enables a reduction in costs and a reduction in weight to be achieved.

The coupling members 44 are respectively provided to both end portions of the frame 32. The plural support portions 50 are respectively coupled together by the coupling members 44. This thereby enables the rigidity of the plural support portions 50 (shaft bearing portions 48) to be increased by the coupling members 44, thereby enabling increased support rigidity of the pair of wheels 34.

The coupling members 44 are formed in circular ring shapes around the circumferential direction of the wheels 34. This also enables the field of vision of the cameras 28 to be enlarged, due to securing openings at the side faces of the frame 32.

The frame structural body 30 includes the elastic support mechanism 36, and the flying machine body 20 is elastically supported by the frame 32 through the elastic support mechanism 36. This thereby enables shock during landing and the like of the flying machine 10 to be absorbed by the elastic support mechanism 36, thereby enabling a shock to the flying machine body 20 to be alleviated.

Next, explanation follows regarding modified examples of the first exemplary embodiment.

In the first exemplary embodiment described above, the flying machine 10 preferably includes a pair of the wheels 34; however, three or more of the wheels 34 may be provided.

Moreover, configuration is made with three of the plural support portions 50; however, the number of the support portions 50 may be two, or may be four or more.

Rotatable tube shaped members may be respectively mounted to the plural support portions 50 such that the wheels 34 are rotatably supported by the plural support portions 50 through the plural tube shaped members. Such a configuration enables rotation properties of the wheels 34 to be improved.

The wheels 34 are rotatably supported by the plural support portions 50 coupled together by the coupling members 44. However, ball bearings may be employed in place of the plural support portions 50 and the coupling members 44. In such a configuration, plural balls provided to the ball bearings correspond to the "plural support portions".

The shaft bearing portions 48 include the plural support portions 50; however, the shaft bearing portions 48 may include circular ring shaped support portions following the circumferential direction of the wheels 34.

The frame 32 is preferably formed in a circular tubular cage shape; however, the frame 32 may be formed in a cage shape with a shape other than a circular tubular shape.

The frame 32 is preferably disposed with its axial direction running in a direction orthogonal to the axial direction of the rotating blades 22; however, the frame 32 may be disposed with its axial direction in a direction other than a direction orthogonal to the axial direction of the rotating blades 22.

The frame 32 is preferably configured including the three rod members of the pair of fixing rods 38, 40 and the protective rod 42; however, the frame 32 may be configured including four or more rod members. The frame 32 may also be configured including members having shapes other than rod shapes.

The flying machine 10 is installed with the cameras 28; however, the flying machine 10 may be installed with devices other than the cameras 28.

The flying machine body 20 includes the four rotating blades 22; however a number other than four of the rotating blades 22 may be provided.

Figure 11:
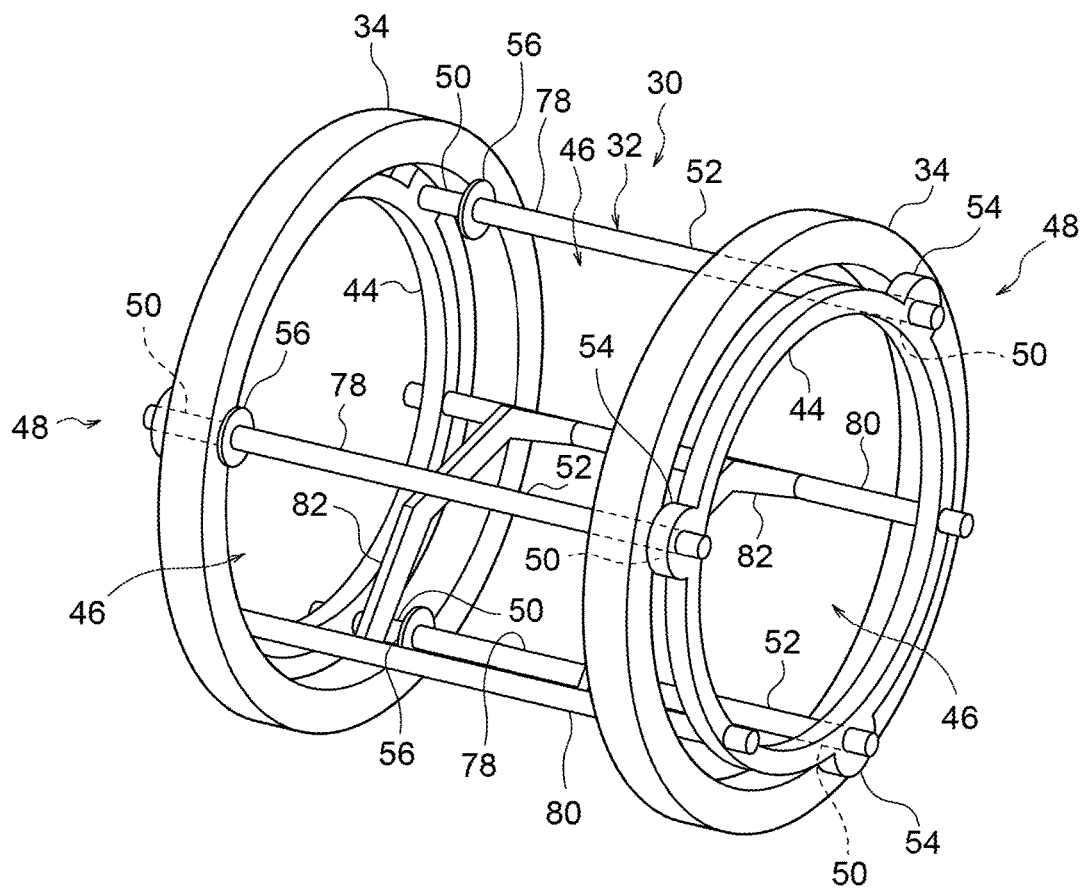
FIG. 11 is a perspective view illustrating a first modified example of a flying machine according to the first exemplary embodiment.
Figure 12:
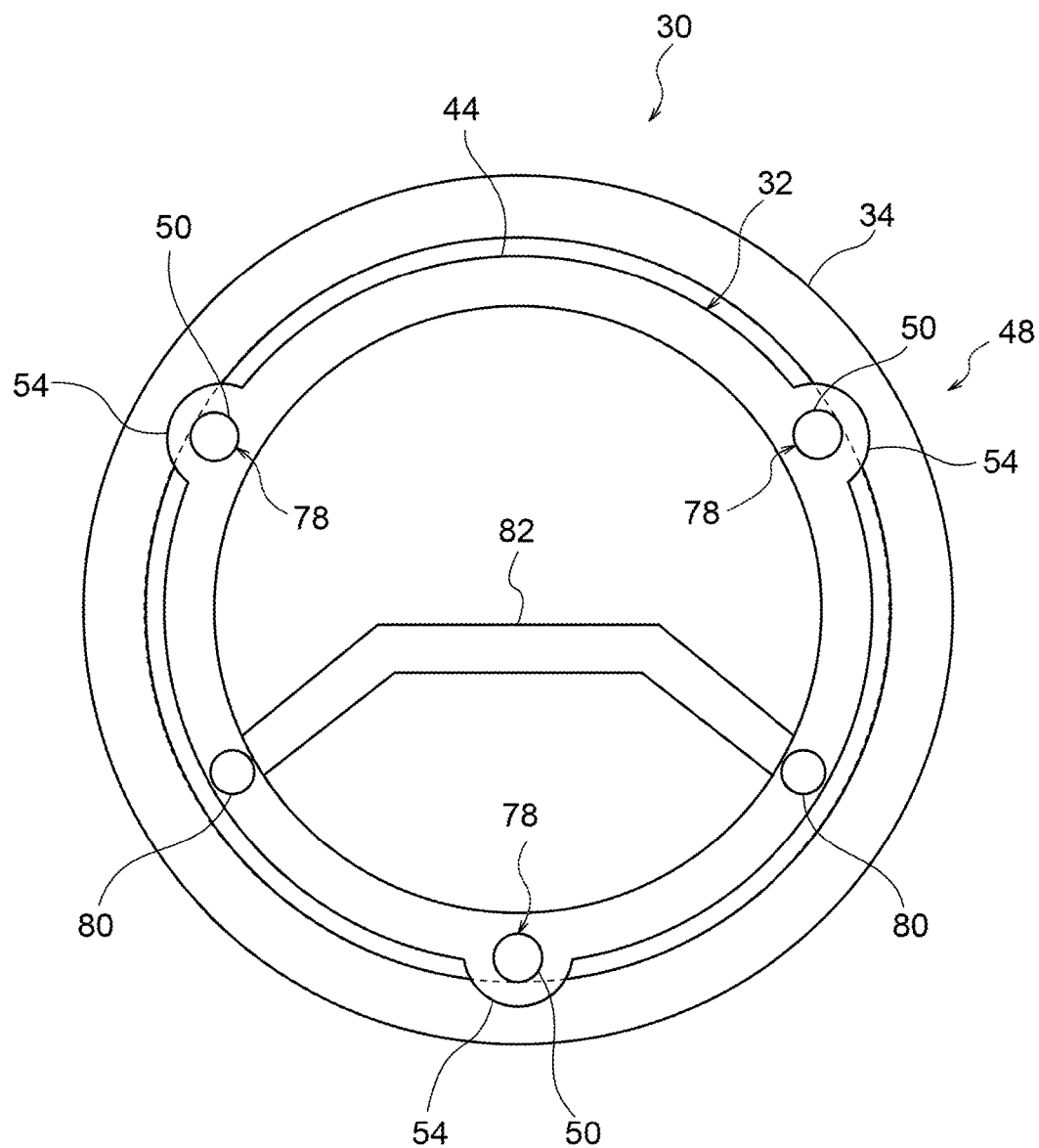
FIG. 12 is a side view illustrating the first modified example of a flying machine according to the first exemplary embodiment.

As illustrated in FIG. 11 and FIG. 12, the structure of the frame structural body 30 may be modified from that of the first exemplary embodiment described above in the following manner. Namely, in a modified example illustrated in FIG. 11 and FIG. 12, the frame 32 is configured including plural rod members 78 and a pair of support rods 80.

Both end portions of each of the plural rod members 78 and the pair of support rods 80 are fixed to the pair of coupling members 44, and the plural support portions 50 are respectively formed at both end portions of the plural rod members 78. Moreover, a pair of support arms 82 span between the pair of support rods 80, and the flying machine body 20 is fixed to the pair of support arms 82 (see FIG. 1).

The frame structural body 30 configured in this manner enables similar operation and advantageous effects to those of the first exemplary embodiment described above.

Figure 13:
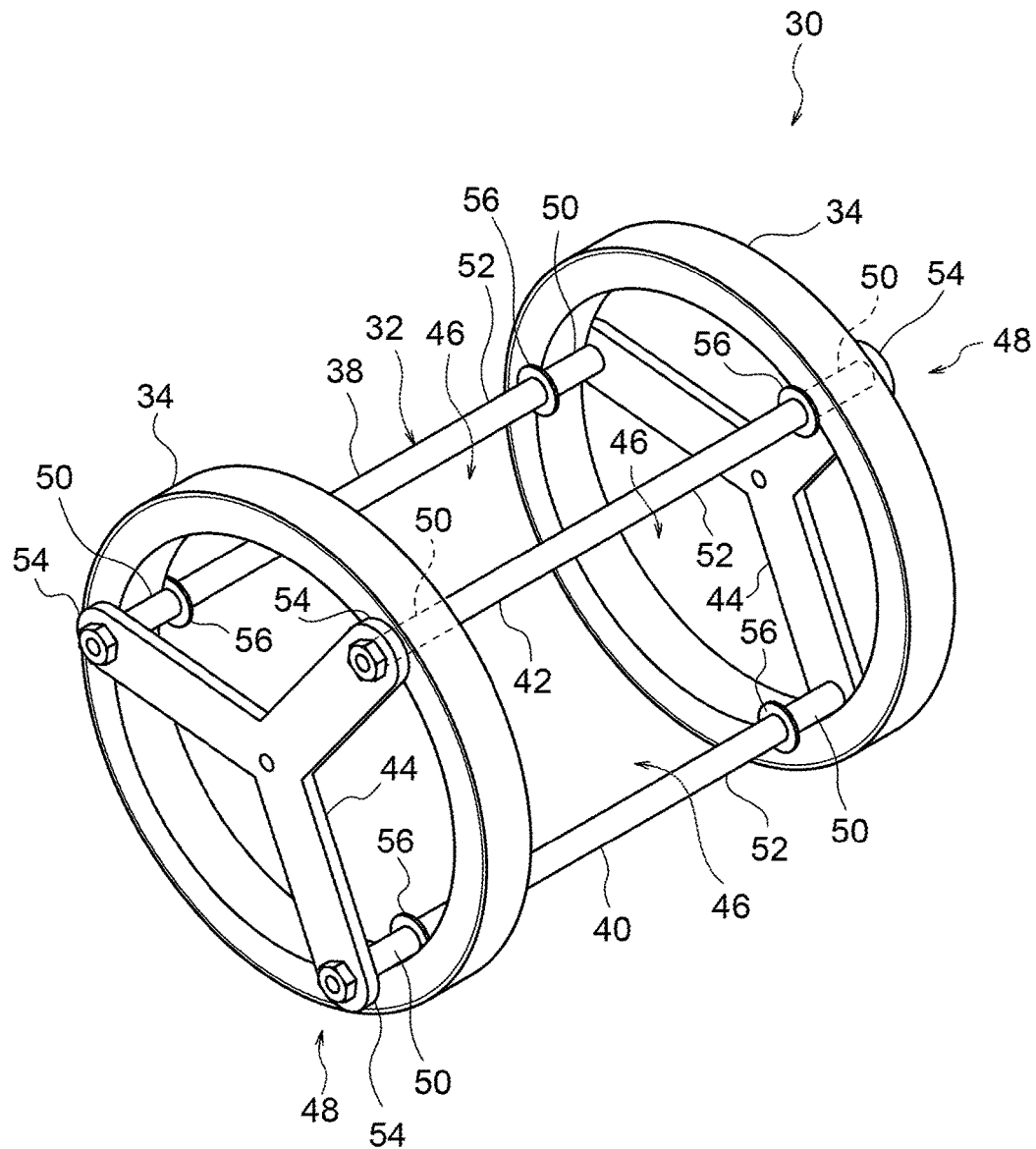
FIG. 13 is a perspective view illustrating a second modified example of a flying machine according to the first exemplary embodiment.
Figure 14:
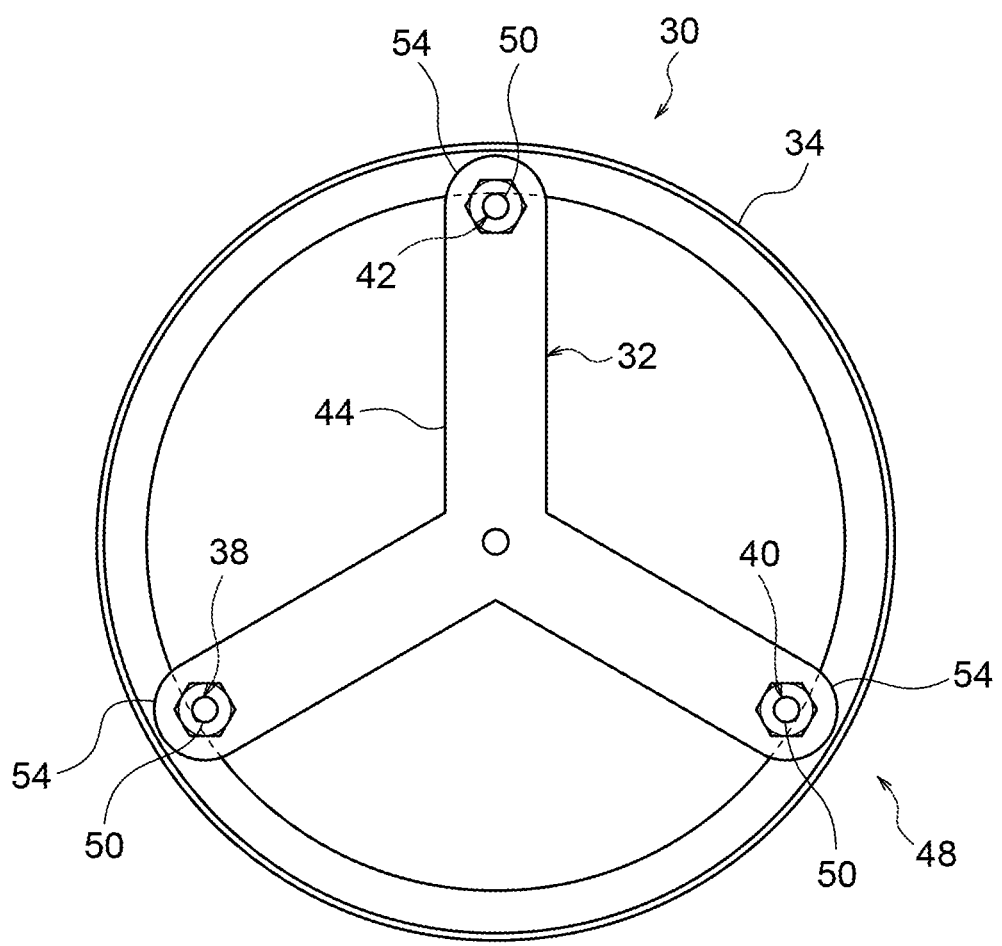
FIG. 14 is a side view illustrating the second modified example of a flying machine according to the first exemplary embodiment.

As illustrated in FIG. 13 and FIG. 14, the structure of the frame structural body 30 may be modified from that of the first exemplary embodiment described above in the following manner. Namely, in a modified example illustrated in FIG. 13 and FIG. 14, the coupling members 44 are formed in a star shape (radiating shape), and the plural support portions 50 are coupled together by the coupling members 44.

The support rigidity of the pair of wheels 34 can accordingly be increased since the rigidity of the plural support portions 50 (shaft bearing portions 48) can be increased even when the coupling members 44 are formed in a star shape in this manner.

Second Exemplary Embodiment

Next, explanation follows regarding a second exemplary embodiment of technology disclosed herein.

Figure 15:
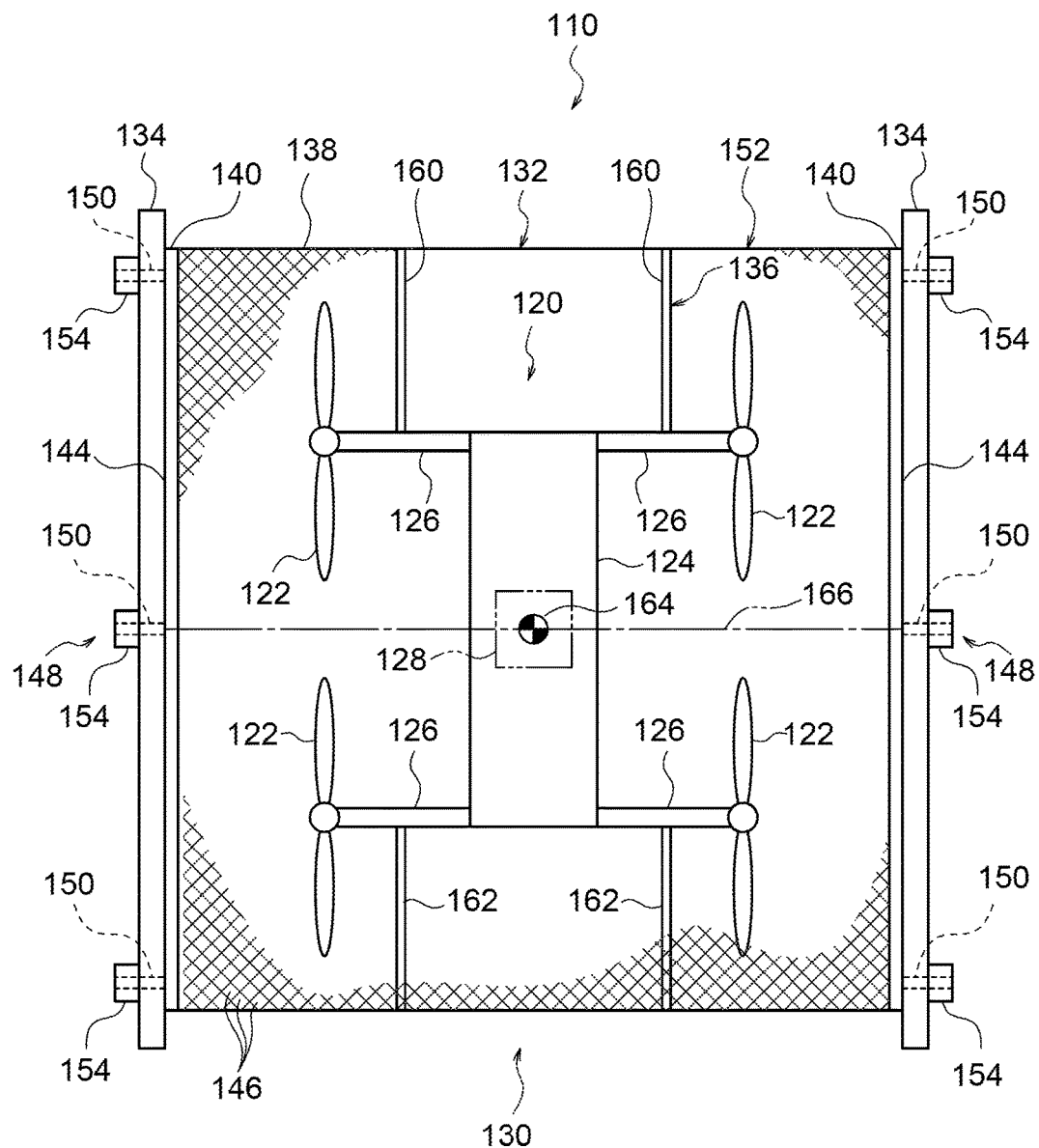
FIG. 15 is a plan view of a flying machine according to a second exemplary embodiment.
Figure 16:
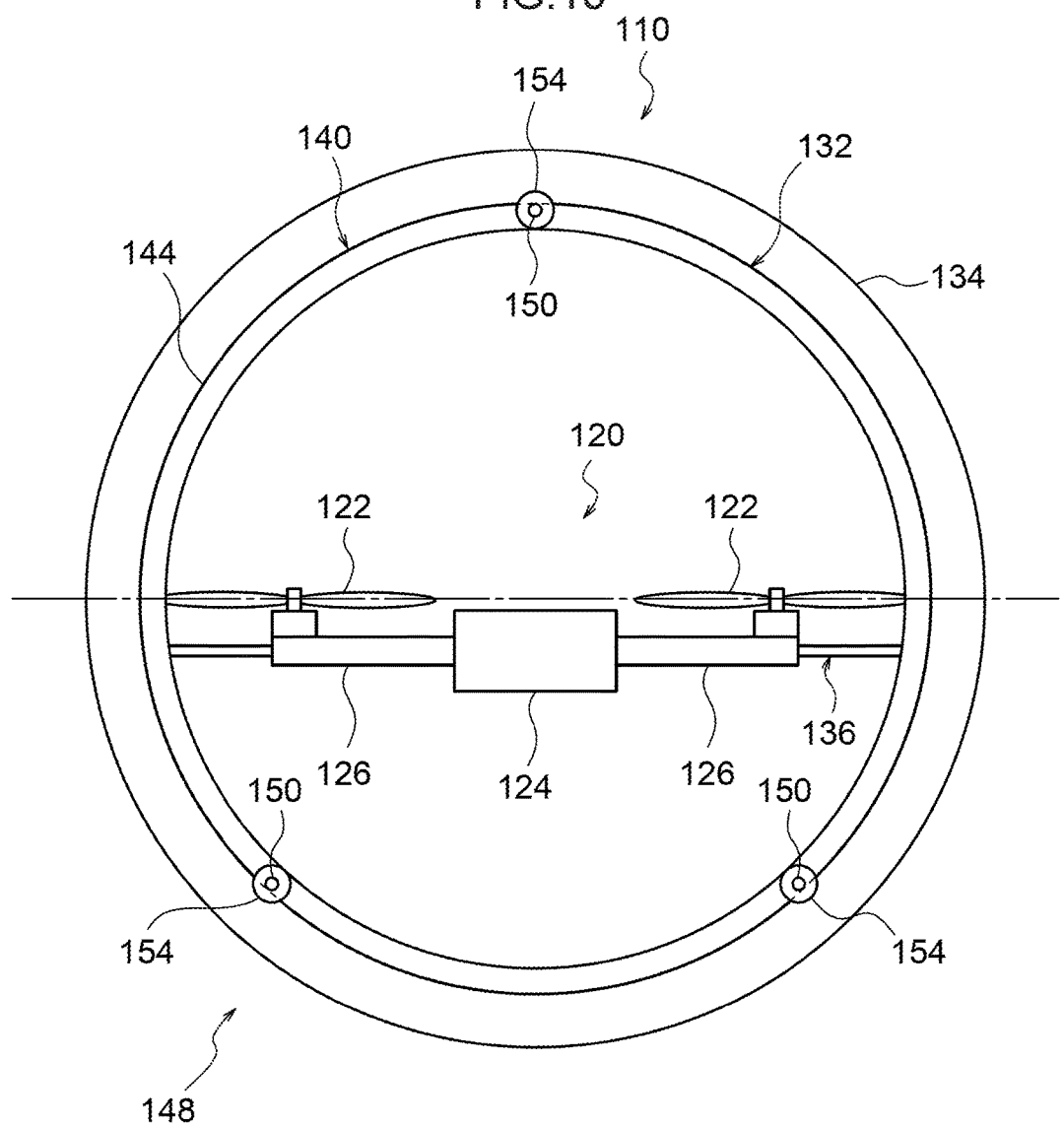
FIG. 16 is a side view of a flying machine according to the second exemplary embodiment.

As illustrated in FIG. 15 and FIG. 16, a flying machine 110 according to the second exemplary embodiment includes a flying machine body 120, and a frame structural body 130.

The flying machine body 120 is, for example, a multicopter, and includes plural rotating blades 122. Each of the plural rotating blades 122 is disposed horizontally, and is rotated by rotation force from a motor or the like. Plural arms 126 extend out from a central body section 124 of the flying machine body 120 along a horizontal direction in an H pattern, and the plural rotating blades 122 are respectively provided to leading end portions of the plural arms 126. The central body section 124 of the flying machine body 120 is installed with a device such as a camera 128.

Figure 17:
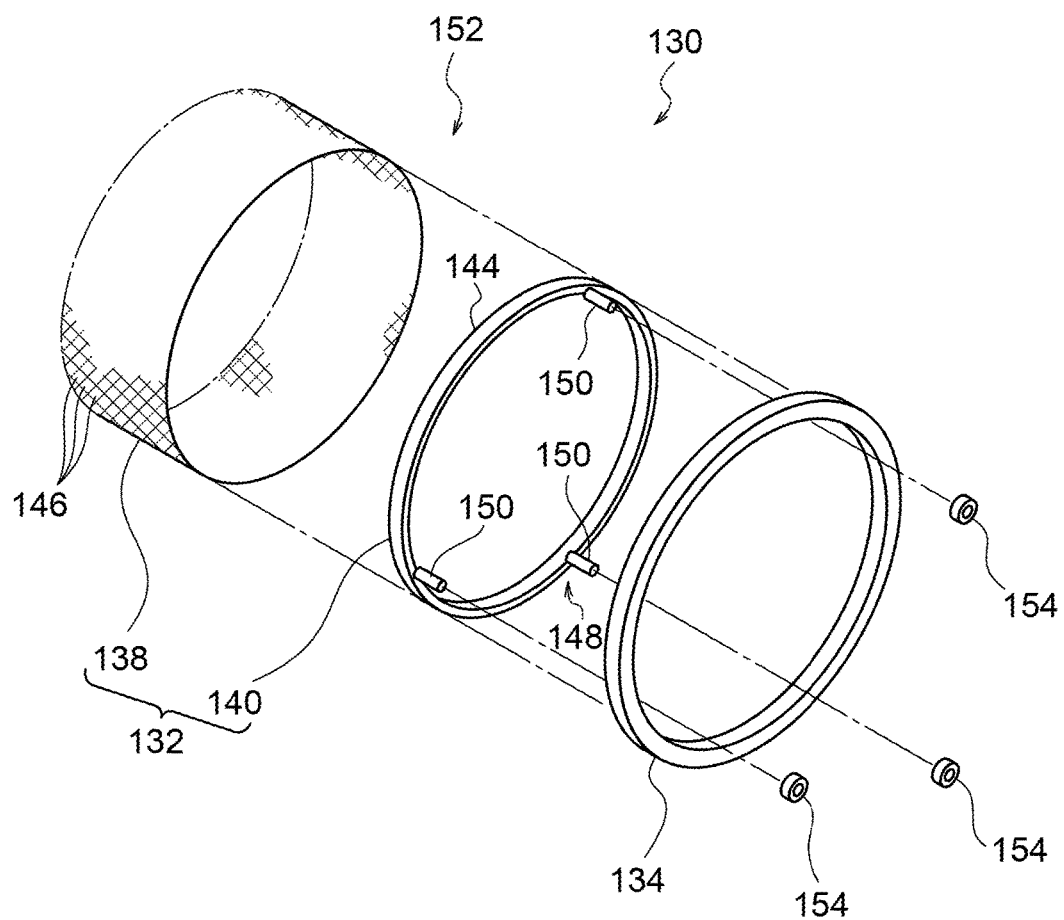
FIG. 17 is an exploded perspective view of a frame structural body according to the second exemplary embodiment.

The frame structural body 130 includes a frame 132, a pair of wheels 134, and a support mechanism 136 (see also FIG. 17, as appropriate). The frame 132 is formed in a substantially circular tubular cage shape, and the flying machine body 120 is surrounded by the frame 132. The frame 132 is disposed with its axial direction running in a direction orthogonal to the axial direction of the rotating blades 122 (in the horizontal direction). The frame 132 includes a mesh member 138 and a pair of fixing rings 140.

The mesh member 138 is formed in a circular tubular shape. Multiple openings formed in the mesh member 138 place the inside and the outside of the frame 132 in communication with each other, forming communication portions 146 through which airflow accompanying flying of the flying machine body 120 (airflow accompanying rotation of the rotating blades 122) passes.

The pair of fixing rings 140 are respectively fixed to both axial direction end portions of the mesh member 138. The pair of fixing rings 140 are each provided with a pair of shaft bearing portions 148 for supporting the pair of wheels 134, described later. Each of the shaft bearing portions 148 is formed from plural support portions 150. Each of the plural support portions 150 is formed projecting out along the axial direction of the fixing rings 140.

A ring body 144 of each of the fixing rings 140 is formed in a circular ring shape around the circumferential direction of the wheels 134. The plural support portions 150 are respectively formed at substantially uniform intervals around the circumferential direction of the ring bodies 144, and are thus disposed at intervals around the circumferential direction of the wheels 134. The plural support portions 150 are respectively coupled together by the ring bodies 144 that follow the circumferential direction of the wheels 134. In the second exemplary embodiment, the ring bodies 144 correspond to a "coupling member".

A portion of the frame 132 between the plural support portions 150 at one end of the frame 132 and the plural support portions 150 at the other end of the frame 132 is formed by the mesh member 138 and the pair of ring bodies 144. The mesh member 138 and the pair of ring bodies 144 function as a coupling section 152 that couples the plural support portions 150 at the one end and the plural support portions 150 at the other end together.

The mesh member 138 and the pair of ring bodies 144 are configured with a slightly smaller diameter than the wheels 134. The entire frame 132, including the mesh member 138 and the pair of ring bodies 144, is accordingly disposed further toward a radial direction inner side of the wheels 134 than outer circumferential faces of the pair of wheels 134.

The pair of wheels 134 are provided at both end portions of the frame 132. The pair of wheels 134 are capable of rotating with respect to the frame 132 due to being supported from the inner side of the wheels 134 by the plural support portions 150 forming the respective shaft bearing portions 148. The pair of wheels 134 are provided at both end portions of the frame 132 so as to be disposed on both lateral width direction sides of the flying machine body 120.

Respective anti-removal members 154 are provided to leading end portions of each of the plural support portions 150 described above. The respective wheels 134 are supported from both sides in the axial direction of the wheels 134 by the plural anti-removal members 154 and the respective ring bodies 144, thereby preventing the wheels 134 from coming off the frame 132.

The support mechanism 136 includes plural support arms 160, 162. The flying machine body 120 is fixed to the frame 132 (mesh member 138) through the plural support arms 160, 162. The support mechanism 136 may be provided with an elastic device so as to configure the support mechanism 136 as an elastic support mechanism that elastically supports the flying machine body 120 with respect to the frame structural body 130.

As illustrated in FIG. 16, as viewed along the horizontal direction, the rotating blades 122 are disposed at the height of the center of rotation of the pair of wheels 134. Moreover, as illustrated in FIG. 15, a center of gravity 164 of the flying machine 110 is positioned at a central portion of a rotation axis line 166 connecting the centers of the pair of wheels 134 together.

The flying machine 110 according to the second exemplary embodiment described above can be employed in similar usage methods (see FIG. 6 to FIG. 9) to those of the flying machine 10 according to the first exemplary embodiment described above.

Next, explanation follows regarding operation and advantageous effects of the second exemplary embodiment.

As described in detail above, in the second exemplary embodiment, the flying machine 110 includes the pair of wheels 134. The flying machine 110 is capable of moving in a state in which the pair of wheels 134 are in contact with a target object. The flying machine 110 is accordingly capable of moving more steadily across the target object than in cases in which the wheels 134 are not provided, thereby enabling mobility performance of the flying machine 110 to be improved.

Since propelling power is provided by rotation of the rotating blades 122 when the flying machine 110 is moving across the target object, there is no need for a dedicated source of power to drive the wheels 134. This thereby enables a reduction in weight, and also enables mobility efficiency to be improved in comparison to cases in which, for example, a dedicated source of power is provided to drive the wheels 134.

Moreover, since the stability of the flying machine 110 is increased due to the pair of wheels 134 contacting the target object, tasks such as imaging, making observations, recording, surveying, making inspections, transportation, coating, and marking can be performed more accurately.

The pair of wheels 134 are capable of rotating independently of each other. This thereby enables the flying machine 110 to turn on the spot by rotating the pair of wheels 134 in opposite directions to each other, thereby enabling maneuverability of the flying machine 110 to be improved.

The flying machine body 120 is surrounded by the frame 132 that is formed in a circular tubular cage shape, thereby enabling the flying machine body 120 to be protected by the frame 132.

Moreover, the pair of wheels 134 are rotatably supported by both end portions of the circular tubular cage shaped frame 132 surrounding the flying machine body 120. This thereby enables support rigidity of the pair of wheels 134 to be secured in comparison to cases in which, for example, the pair of wheels 134 are supported by both end portions of a single wheel shaft. This thereby enables oscillation of the pair of wheels 134 to be suppressed when the flying machine 110 is flying, for example, thereby enabling the stability of the flying machine 110 during flight to be improved.

In the frame structural body 130, the frame 132 is fixed, and the pair of wheels 134 are rotated with respect to the frame 132. This thereby enables a reduction in size of rotating parts (namely, parts that generate a gyroscopic effect when the flying machine 110 is in flight) in comparison to cases in which the frame 132 and the pair of wheels 134 rotate in their entirety. This thereby enables any effect on the flight of the flying machine 110 to be suppressed.

More specifically, the pair of wheels 134 are rotatably supported by the pair of shaft bearing portions 148 provided at both end portions of the frame 132. Each of the pair of shaft bearing portions 148 includes the plural support portions 150 disposed at intervals around the circumferential direction of the wheels 134, and the plural support portions 150 rotatably support the respective wheels 134.

This thereby enables spokes to be omitted from the wheels 134, enabling a reduction in weight, and also enabling a reduction in air resistance. As a result, this enables flight performance of the flying machine 110 to be improved, and also enables wind endurance performance of the flying machine 110 to be improved. Moreover, openings can be secured at side faces of the frame 132 by omitting spokes from the wheels 134, thereby enabling the field of vision of the camera 128 to be enlarged in cases in which the camera 128 is installed to the flying machine body 120.

The frame 132 includes the mesh member 138 and the pair of ring bodies 144. Moreover, the plural support portions 150 on one of the pair of shaft bearing portions 148, and the plural support portions 150 on the other of the pair of shaft bearing portions 148, are coupled together by the coupling section 152 formed by the mesh member 138 and the pair of ring bodies 144. This thereby enables the coupling rigidity of the pair of shaft bearing portions 148, and therefore the support rigidity of the pair of wheels 134, to be increased, while using the mesh member 138 to secure the communication portions 146 that place the inside and the outside of the frame 132 in communication with each other.

A main body portion of the frame 132 is formed from the mesh member 138. This thereby enables both a reduction in weight of the frame structural body 130, and protection of the flying machine body 120.

The fixing rings 140 are respectively provided at both end portions of the frame 132, and the plural support portions 150 are respectively coupled together by the ring bodies 144 of the fixing rings 140. This thereby enables the rigidity of the plural support portions 150 (shaft bearing portions 148) to be increased by the ring bodies 144, thereby enabling the support rigidity of the pair of wheels 134 to be increased.

The ring bodies 144 are formed in circular ring shapes following the circumferential direction of the wheels 134. This also secures openings at side faces of the frame 132, thereby enabling the field of vision of the camera 128 to be enlarged, for example, in cases in which the flying machine body 120 is installed with the camera 128.

Next, explanation follows regarding modified examples of the second exemplary embodiment.

In the second exemplary embodiment described above, the flying machine 110 preferably includes a pair of the wheels 134; however, three or more of the wheels 134 may be provided.

Moreover, configuration is made with three of the plural support portions 150; however, however, the number of the support portions 150 may be two, or may be four or more.

The plural support portions 150 are fixed to the ring bodies 144; however, the plural support portions 150 may be rotatable with respect to the ring bodies 144. Such a configuration enables rotation properties of the wheels 134 to be improved.

The wheels 134 are rotatably supported on the plural support portions 150 formed to the fixing rings 140. However, ball bearings may be employed in place of the fixing rings 140. In such a configuration, plural balls provided to the ball bearings correspond to the "plural support portions".

The shaft bearing portions 148 include the plural support portions 150. However, the shaft bearing portions 148 may include circular ring shaped support portions formed around the circumferential direction of the wheels 134

The frame 132 is preferably formed in a circular tubular cage shape; however, the frame 132 may be formed in a cage shape with a shape other than a circular tubular shape.

The frame 132 is preferably disposed with its axial direction running in a direction orthogonal to the axial direction of the rotating blades 122; however, the frame 132 may be disposed in with its axial direction running in a direction other than a direction orthogonal to the axial direction of the rotating blades 122.

The flying machine body 120 includes four of the rotating blades 122; however a number other than four of the rotating blades 122 may be provided.

Third Exemplary Embodiment

Next, explanation follows regarding a third exemplary embodiment of technology disclosed herein.

Figure 18:
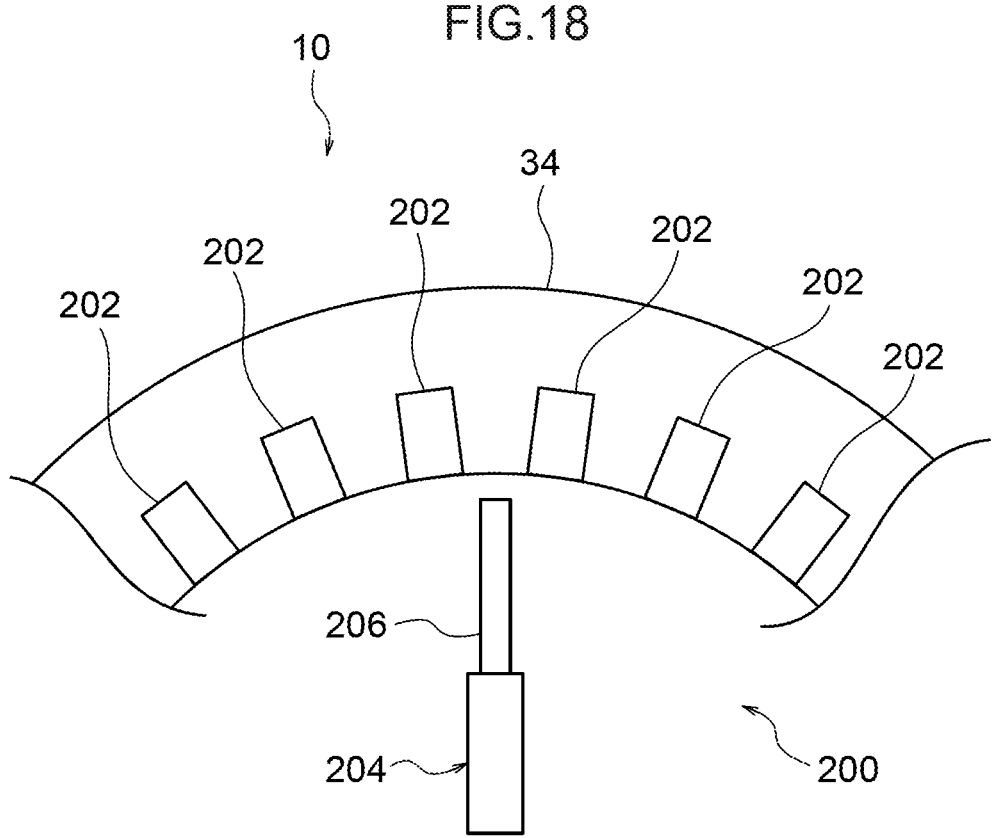
FIG. 18 is an enlarged drawing of relevant portions of a frame structural body according to a third exemplary embodiment.

In the third exemplary embodiment illustrated in FIG. 18, the flying machine 10 according to the first exemplary embodiment described above is additionally provided with a wheel controller 200. The wheel controller 200 includes plural projections 202 provided to each of the wheels 34, and stoppers 204. Each stopper 204 is, for example, an actuator that is actuated by a signal emitted from a controller. The stopper 204 includes a movable portion 206, and the movable portion 206 moves in and out to switch between a state in which the movable portion 206 is inserted between the plural projections 202, and a state in which the movable portion 206 is retracted from between the plural projections 202.

According to this configuration, the wheel controller 200 can switch between a state in which rotation of the wheels 34 is permitted, and a state in which rotation of the wheels 34 is restricted. Accordingly, for example, the stopper 204 can be actuated to restrict rotation of the wheels 34 during flight of the flying machine 10, thereby enabling a gyroscopic effect accompanying rotation of the wheels 34 to be suppressed. This thereby enables rotation of the wheels 34 to be suppressed from affecting the flight of the flying machine 10, thereby enabling the stability of the flying machine 10 during flight to be improved.

Actuating the stopper 204 to restrict rotation of the wheels 34 during flight of the flying machine 10 enables rotation of the wheels 34 caused by wind to be suppressed. This thereby enables the wind endurance performance of the flying machine 10 to be improved.

When the flying machine 10 moves with the wheels 34 rolling across a wall surface or the ground surface, braking of the wheels 34 can be performed by actuating the stopper 204 to restrict rotation of the wheels 34, thereby enabling braking performance of the flying machine 10 to be improved.

Note that the wheel controller 200 according to the third exemplary embodiment may be applied to the flying machine 110 according to the second exemplary embodiment described above (FIG. 15, FIG. 16).

Fourth Exemplary Embodiment

Next, explanation follows regarding a fourth exemplary embodiment of technology disclosed herein.

In the fourth exemplary embodiment illustrated in FIG. 19, the structure of the flying machine 10 according to the first exemplary embodiment described above is modified in the following manner. Namely, the flying machine body 20 is attached to the frame structural body 30 in which the axial direction of the frame structural body 30 runs along a height direction. Moreover, the flying machine body 20 is rotatably supported by the support arms 60 of the frame 32 through a rotation shaft 210. The rotation shaft 210 is disposed with its axial direction running along a radial direction of the frame 32 (in a front-rear direction of the flying machine body 20).

Figure 19:
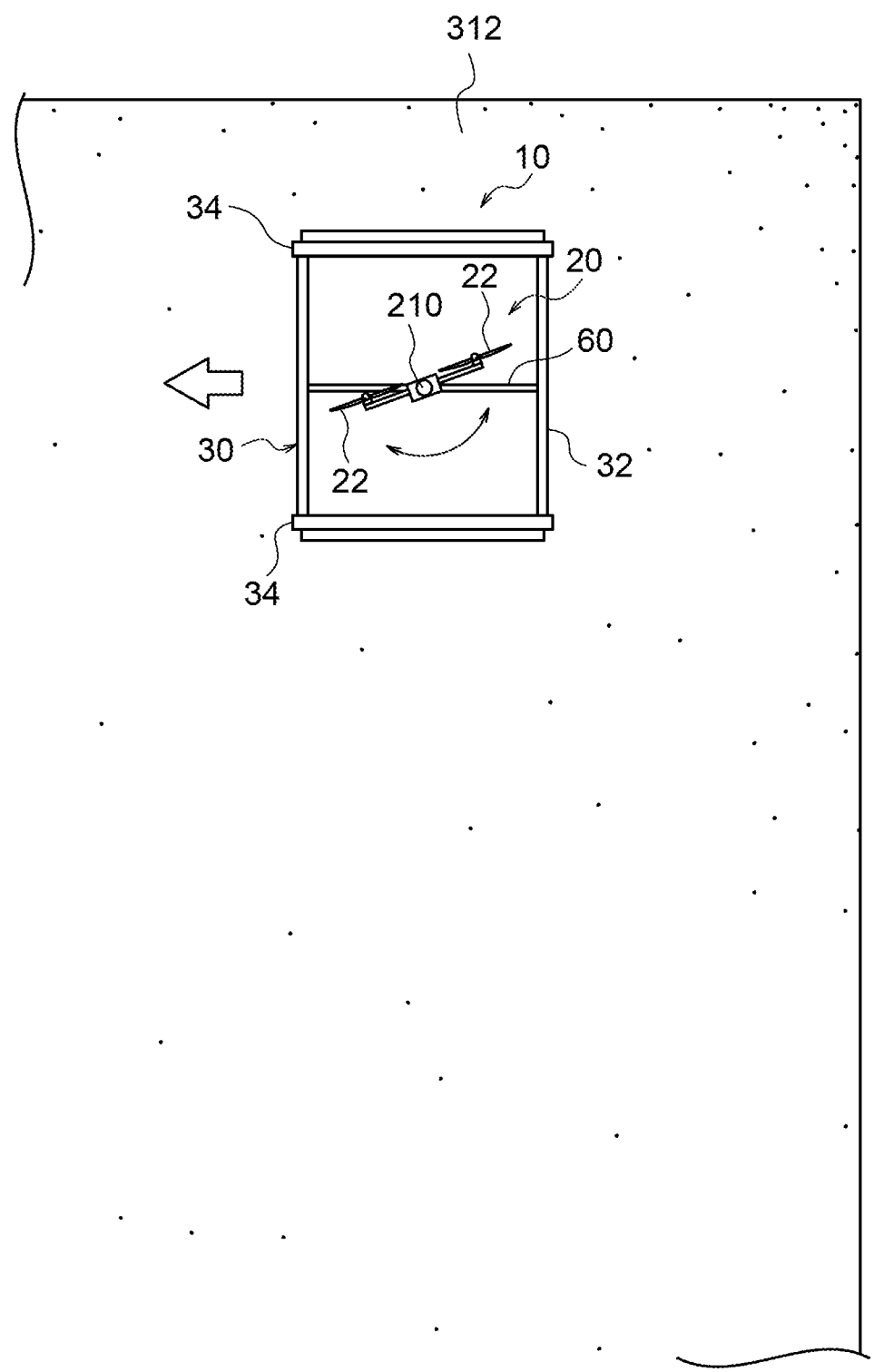
FIG. 19 is a drawing illustrating a flying machine according to a fourth exemplary embodiment and a usage state thereof.

According to this configuration, as illustrated in FIG. 19, for example, the flying machine body 20 can be tilted to either the left or the right even in a state in which the frame structural body 30 is in contact with a wall surface 312, and the frame structural body 30 is disposed with its axial direction along the vertical direction. This thereby enables the flying machine 10 to move across the wall surface 312 in the horizontal direction in conjunction with rotation of the pair of wheels 34 due to the contact with the wall surface 312.

Note that a structure including the rotation shaft 210 according to the fourth exemplary embodiment described above may be applied to the second or the third exemplary embodiments described above.

Fifth Exemplary Embodiment

Next, explanation follows regarding a fifth exemplary embodiment of technology disclosed herein.

In the fifth exemplary embodiment illustrated in FIG. 20, the structure of the flying machine 10 according to the first exemplary embodiment described above is modified in the following manner. Namely, the flying machine body 20 is rotatably supported by the support arms 60 of the frame 32 through a rotation shaft 220. The rotation shaft 220 is disposed with its axial direction running along a radial direction of the frame 32 (in the height direction of the flying machine body 20).

According to this configuration, as illustrated in FIG. 20, for example, the frame structural body 30 is capable of rotating with respect to the flying machine body 20 due to part of the frame structural body 30 (for example one of the wheels 34) contacting the wall surface 312, even when the flying machine 10 approaches the wall surface 312 from an oblique direction with respect to the wall surface 312 in plan view. This thereby enables the pair of wheels 34 to contact the wall surface 312 smoothly.

Figure 21:
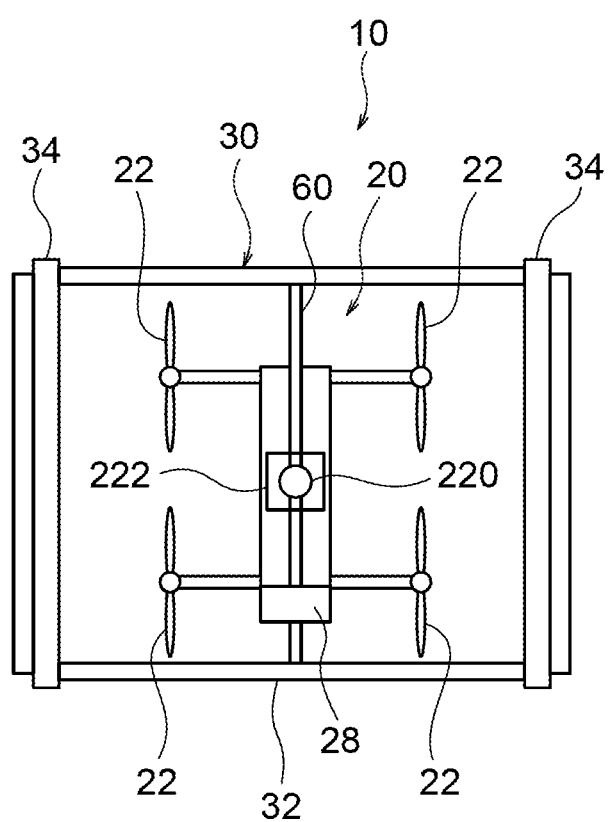
FIG. 21 is a plan view of a flying machine according to the fifth exemplary embodiment.

Note that as illustrated in FIG. 21, in the fifth exemplary embodiment, the flying machine 10 may be provided with an orientation controller 222. The orientation controller 222 is configured by an actuator that switches between a state in which the flying machine body 20 is permitted to rotate relative to the frame 32, and a state in which the flying machine body 20 is restricted from rotating relative to the frame 32. The flying machine body 20 is fixed in a desired orientation with respect to the frame 32 by the orientation controller 222.

According to this configuration, the orientation of the flying machine body 20 can be fixed independently of the direction of the wheels 34. The direction of the cameras 28 installed to the flying machine body 20 can thereby be controlled by, for example, fixing the flying machine body 20 in a desired orientation.

A structure including the rotation shaft 220 according to the fifth exemplary embodiment described above may be applied to the second or the third exemplary embodiments described above. Moreover, the orientation controller 222 according to the fifth exemplary embodiment may be applied to the second to the fourth exemplary embodiments described above.

Sixth Exemplary Embodiment

Next, explanation follows regarding a sixth exemplary embodiment of technology disclosed herein.

Figure 22:
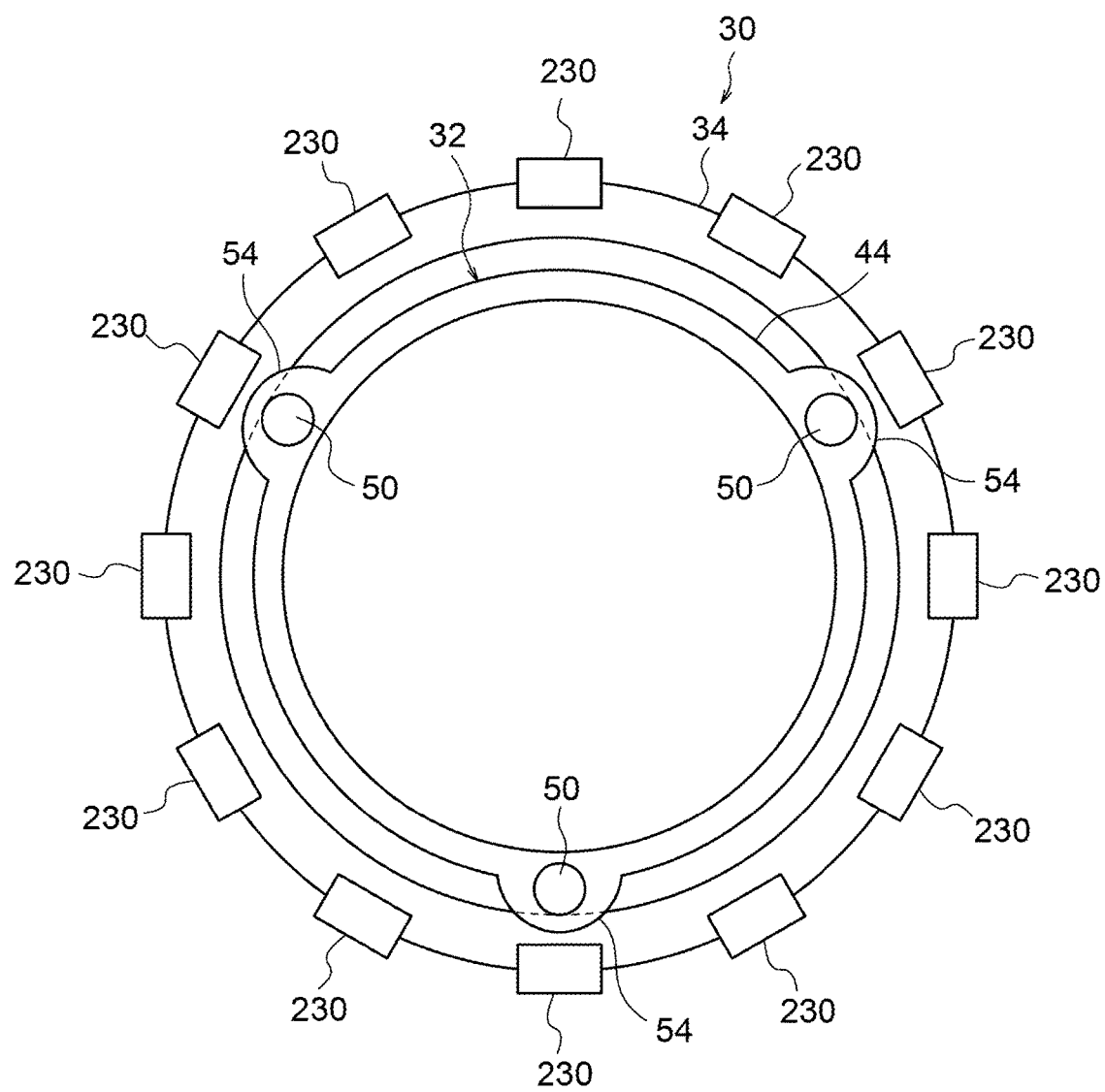
FIG. 22 is a side view illustrating a frame structural body according to a sixth exemplary embodiment.

In the sixth exemplary embodiment illustrated in FIG. 22, the structure of the wheels 34 is modified in the following manner with respect to the frame structural body 30 according to the first exemplary embodiment described above. Namely, in the sixth exemplary embodiment, omni wheels are employed for the wheels 34. Each of the wheels 34 includes plural rotating bodies 230. The plural rotating bodies 230 are rotatably supported by rotation shafts with axial directions in directions tangential to the wheels 34.

Figure 23:
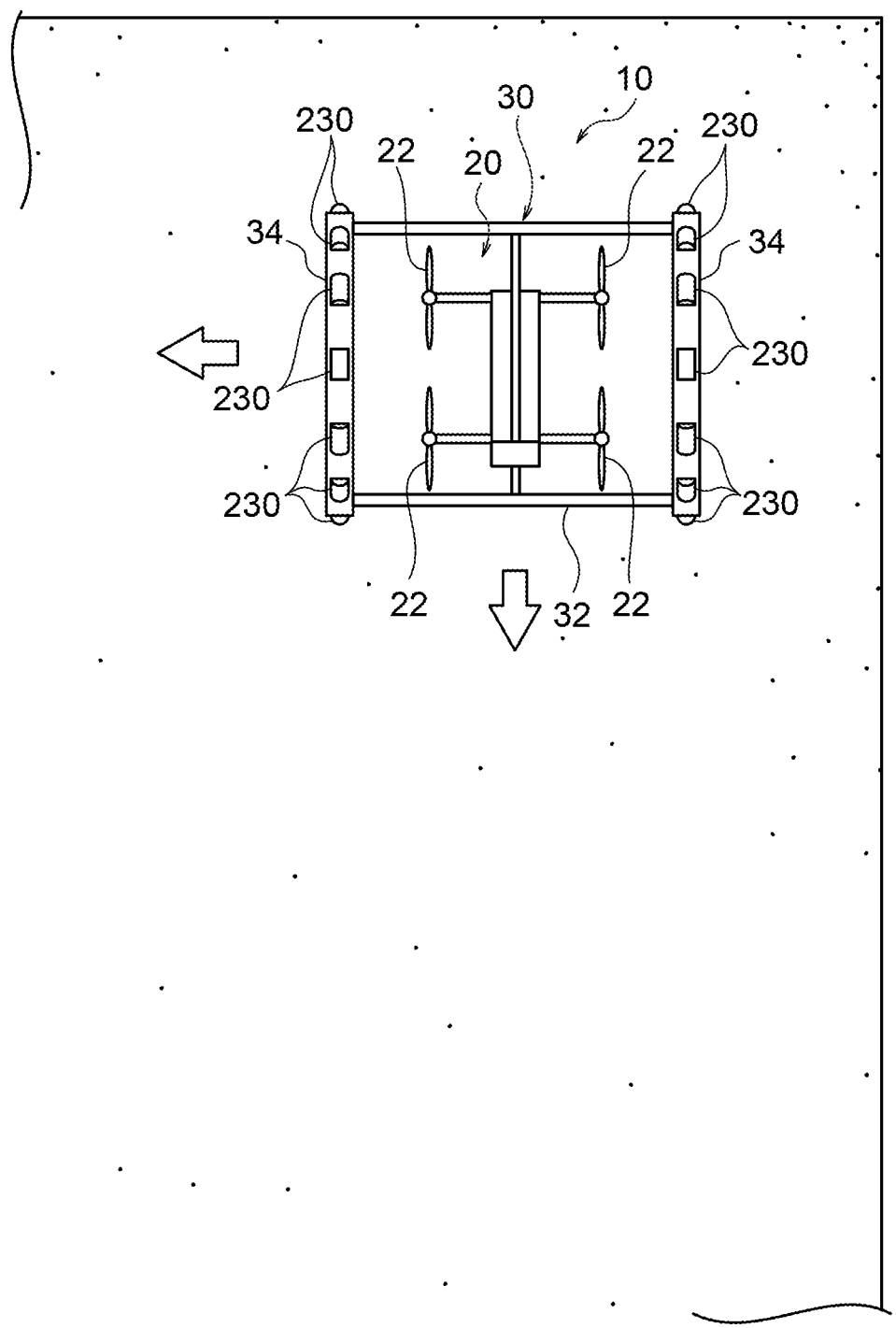
FIG. 23 is a drawing illustrating a usage state of a flying machine according to the sixth exemplary embodiment.

According to this configuration, as illustrated in FIG. 23, for example, the flying machine 10 can be moved in a horizontal direction due to rotation of the plural rotating bodies 230, even when the frame structural body 30 is disposed with its axial direction along the horizontal direction. This enables maneuverability of the flying machine 10 to be improved as a result.

Note that the structure (omni wheels) of the wheels 34 according to the sixth exemplary embodiment may be applied to the second to the fifth exemplary embodiments described above.

Explanation has been given regarding the first to the sixth exemplary embodiments of technology disclosed herein. However, the technology disclosed herein is not limited to the above, and obviously various other modifications may be implemented within a range not departing from the spirit of the technology disclosed herein.

Technology disclosed herein enables the mobility performance of a flying machine to be improved, while securing the support rigidity of plural wheels.

All cited documents, patent applications and technical standards mentioned in the present specification are incorporated by reference in the present specification to the same extent as if the individual cited document, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A flying machine frame structural body comprising:
   a frame that surrounds a flying machine body including a rotating blade with the flying machine body fixed to the frame; and
   a plurality of wheels that are rotatably supported by the frame,
   wherein the frame is disposed further toward a radial direction inner side of the wheels than outer circumferential faces of the plurality of wheels.

2. The flying machine frame structural body of claim 1, wherein the frame includes a communication portion at which an inside and an outside of the frame of the frame are placed in communication with each other.

3. The flying machine frame structural body of claim 1, wherein the frame is formed in a tubular cage shape.

4. The flying machine frame structural body of claim 1, wherein an axial direction of the frame is disposed in a direction orthogonal to an axial direction of the rotating blade.

5. The flying machine frame structural body of claim 1, wherein:
   the frame is provided with a plurality of shaft bearing portions that support the respective wheels; and
   each of the shaft bearing portions includes a plurality of support portions disposed at intervals around a circumferential direction of the wheels, and rotatably supports the wheels at the plurality of support portions.

6. The flying machine frame structural body of claim 5, wherein the frame includes a coupling section that couples together the plurality of support portions of one of the shaft bearing portions and the plurality of support portions of another of the shaft bearing portions.

7. The flying machine frame structural body of claim 5, wherein the plurality of support portions support the wheels from an inner side of the wheels.

8. The flying machine frame structural body of claim 5, wherein the plurality of support portions are coupled together by a coupling member.

9. The flying machine frame structural body of claim 8, wherein the coupling member is formed in a circular ring shape following the circumferential direction of the wheels.

10. The flying machine frame structural body of claim 5, wherein:
    the frame includes a plurality of rod members extending in an axial direction of the frame; and
    the plurality of support portions are formed at end portions of the plurality of rod members.

11. The flying machine frame structural body of claim 10, wherein the plurality of rod members include:
    a pair of fixing rods to which the flying machine body is fixed; and
    a protective rod that together with the pair of fixing rods surrounds the flying machine body.

12. The flying machine frame structural body of claim 1, wherein the frame includes a tube shaped mesh member.

13. The flying machine frame structural body of claim 1, wherein the wheels are formed from a foamed material.

14. The flying machine frame structural body of claim 1, further comprising an elastic support mechanism that elastically supports the flying machine body with respect to the frame.

15. The flying machine frame structural body of claim 1, further comprising a wheel controller that switches between a state in which rotation of the wheels is permitted, and a state in which rotation of the wheels is restricted.

16. The flying machine frame structural body of claim 1, wherein the wheels are omni wheels.

17. A flying machine comprising:
    a flying machine body including a rotating blade;
    a flying machine frame structural body including
    a frame that is fixed to the flying machine body and surrounds the flying machine body; and
    a plurality of wheels that are rotatably supported by the frame,
    wherein the frame is disposed further toward a radial direction inner side of the wheels than outer circumferential faces of the plurality of wheels.

18. The flying machine of claim 17, wherein:
    the flying machine body includes a camera; and
    the camera is surrounded by the frame.

19. The flying machine of claim 17, wherein:
    the frame is disposed in a horizontal direction; and
    the rotating blade is disposed at a height of a center of rotation of the plurality of wheels as viewed along the horizontal direction.

20. The flying machine of claim 17, wherein:
the plurality of wheels includes a pair of wheels respectively disposed at axial direction end portions of the frame; and
a center of gravity of the flying machine is positioned at a central portion on a rotation axis line connecting centers of the pair of wheels together.

21. The flying machine of claim 17, further comprising a rotation shaft that rotatably supports the flying machine body with respect to the frame.

22. The flying machine of claim 21, further comprising an orientation controller that switches between a state in which relative rotation of the flying machine body with respect to the frame is permitted, and a state in which relative rotation of the flying machine body with respect to the frame is restricted.

23. A flying machine usage method employing the flying machine of claim 17, the method comprising:
providing a flying machine body including a rotating blade, a flying machine frame structural body including a frame that is fixed to the flying machine body and surrounds the flying machine body, and a plurality of wheels that are rotatably supported by the frame, the frame is disposed further toward a radial direction inner side of the wheels than outer circumferential faces of the plurality of wheels;
contacting the plurality of wheels against a target object of at least one target object selected from the group consisting of a bridge, a building, a tunnel, a roof, a ladder, a pylon, a chimney, a large passenger aircraft, another structure, and the ground, and
rotating the rotating blade to move the flying machine across the target object in conjunction with rotation of the plurality of wheels.

24. A flying machine usage method employing the flying machine of claim 17, the method comprising:
floating the flying machine on a water surface; and
rotating the rotating blade to move the flying machine across the water surface.

25. The flying machine usage method of claim 23, wherein the flying machine is made to perform at least one task from the group consisting of imaging, making observations, recording, surveying, making inspections, transportation, coating, marking, and another task, while the flying machine is moved.

* * * * *